(12) United States Patent
Kondo et al.

(10) Patent No.: US 8,111,325 B2
(45) Date of Patent: Feb. 7, 2012

(54) IMAGE PROCESSING APPARATUS AND METHOD AND PROGRAM

(75) Inventors: Tetsujiro Kondo, Tokyo (JP); Takeshi Miyai, Kanagawa (JP); Masashi Uchida, Tokyo (JP); Takuo Morimura, Kanagawa (JP); Shizuo Chikaoka, Tokyo (JP); Daisuke Kikuchi, Tokyo (JP); Takeshi Kunihiro, Kanagawa (JP); Hideki Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1373 days.

(21) Appl. No.: 11/681,935

(22) Filed: Mar. 5, 2007

(65) Prior Publication Data

US 2007/0216801 A1    Sep. 20, 2007

(30) Foreign Application Priority Data

Mar. 16, 2006    (JP) .................................. 2006-073556

(51) Int. Cl.
*H04N 7/01* (2006.01)
*H04N 11/20* (2006.01)

(52) U.S. Cl. .......................... 348/452; 348/451; 348/446

(58) Field of Classification Search .................. None
See application file for complete search history.

(56) References Cited

U.S. PATENT DOCUMENTS

| 5,317,397 A | * | 5/1994 | Odaka et al. | 375/240.15 |
| 5,623,311 A | * | 4/1997 | Phillips et al. | 375/240.25 |
| 7,006,157 B2 | * | 2/2006 | Sohn | 348/699 |
| 2005/0018076 A1 | * | 1/2005 | Riemens et al. | 348/446 |

FOREIGN PATENT DOCUMENTS

| JP | 2000-261768 | 9/2000 |
| JP | 2004-88234 | 3/2004 |
| JP | 2004 88234 | * 3/2004 |

* cited by examiner

*Primary Examiner* — Jefferey Harold
*Assistant Examiner* — Michael Teitelbaum
(74) *Attorney, Agent, or Firm* — Oblon, Spivak, McClelland, Maier & Neustadt, L.L.P.

(57) ABSTRACT

An image processing apparatus includes an interlace-progressive converter converting an interlace input image into a progressive intermediate image, a motion-vector detector detecting motion vectors of the input image by using a distance shorter than the pixel interval of the intermediate image, a cyclic-coefficient setting unit setting, on the basis of a vertical motion, a first cyclic coefficient for a first type of pixel and a second cyclic coefficient for a second type of pixel, a motion compensator motion-compensating, on the basis of the motion vectors, a past progressive output image to generate a motion-compensated image, and an output image generator generating a progressive output image by adding pixel values of the first type of pixels and the second type of pixels of the progressive intermediate image and the motion-compensated image by using the first cyclic coefficient and the second cyclic coefficient as weights.

2 Claims, 19 Drawing Sheets

IMAGE PROCESSING APPARATUS AND METHOD AND PROGRAM

CROSS REFERENCES TO RELATED APPLICATIONS

The present invention contains subject matter related to Japanese Patent Application JP 2006-073556 filed in the Japanese Patent Office on Mar. 16, 2006, the entire contents of which are incorporated herein by reference.

BACKGROUND OF THE INVENTION

1. Field of the Invention

The present invention relates to image processing apparatuses and methods, and programs, and more particularly, to an image processing apparatus and method, and a program that allow an interlace image into a higher-quality progressive image.

2. Description of the Related Art

When a subject moving in the vertical direction is photographed or when a subject is photographed while moving a photographing device in the vertical direction, aliasing distortion in the vertical direction (hereinafter referred to as "vertical aliasing distortion") occurs in interlace images due to an insufficient restriction of the band in the vertical direction. As a result, the thickness of lines in the horizontal direction or the intensity of edge is changed. The vertical aliasing distortion may become more noticeable when interlace images are converted into progressive images (such conversion is hereinafter referred to as interlace-progressive (IP) conversion).

One IP conversion technique for improving the resolution of moving portions of a subject by performing motion-compensation using motion vectors is disclosed in, for example, Japanese Unexamined Patent Application Publication No. 2000-261768.

A technique for reducing cyclic distortion, such as vertical aliasing distortion, or random noise is disclosed in, for example, Japanese Unexamined Patent Application Publication No. 2004-88234. In this technique, motion-compensation is performed using a motion vector determined between a current frame and the previous frame (one frame before), and then, the pixel values of the pixels of the current frame and the previous frame are added by using a cyclic coefficient as a weight. If the cyclic coefficient is K ($0 \leq K \leq 1$), the pixel values of the pixels of the current frame and those of the motion-compensated image are multiplied by 1−K and K, respectively, and then, the pixel values are added. In this case, if the cyclic coefficient is excessively increased, image blur may occur in moving portions of the image due to afterimage although vertical aliasing distortion or random noise is reduced. Accordingly, in the invention disclosed in Japanese Unexamined Patent Application Publication No. 2004-88234, the cyclic coefficient is varied depending on moving components, which are differences between the current frame and the previous frame.

SUMMARY OF THE INVENTION

In the invention disclosed in Japanese Unexamined Patent Application Publication No. 2000-261768, however, in an IP-converted progressive image, although the resolution of moving portions of a subject is improved, it is difficult to suppress vertical aliasing distortion.

In the invention disclosed in Japanese Unexamined Patent Application Publication No. 2004-88234, the cyclic coefficient is varied only depending on motion components, and thus, it is difficult to sufficiently suppress image blur.

It is thus still desirable to convert interlace images into higher-quality progressive images.

According to an embodiment of the present invention, there is provided an image processing apparatus for converting an interlace input image into a progressive output image. The image processing apparatus includes IP conversion means for converting the interlace input image into a progressive intermediate image, motion-vector detection means for detecting motion vectors of the interlace input image by using, as a minimum unit, a distance shorter than an interval between pixels forming the progressive intermediate image, cyclic-coefficient setting means for setting, on the basis of a vertical motion, which is a vertical component of each of the motion vectors, a first cyclic coefficient for a first type of pixel that is located at a position where a pixel forming the interlace input image exists, and a second cyclic coefficient for a second type of pixel, which is located at a position where a pixel forming the interlace input image does not exist, motion compensation means for motion-compensating, on the basis of the motion vectors, a past progressive output image to generate a motion-compensated image, and output image generating means for generating the progressive output image by adding pixel values of the first type of pixels located at corresponding positions of the progressive intermediate image and the motion-compensated image by using the first cyclic coefficient as a weight and by adding pixel values of the second type of pixels located at corresponding positions of the progressive intermediate image and the motion-compensated image by using the second cyclic coefficient as a weight.

The cyclic-coefficient setting means may set the first cyclic coefficient and the second cyclic coefficient to be smaller when an absolute value of the vertical motion is 0 or as the absolute value of the vertical motion is closer to an even-number multiple of the interval between the pixels forming the progressive intermediate image, and the cyclic-coefficient setting means may set the first cyclic coefficient and the second cyclic coefficient to be greater as the absolute value of the vertical motion closer to an odd-number multiple of the interval between the pixels forming the progressive intermediate image.

The cyclic-coefficient setting means may set the second cyclic coefficient to be greater than the first cyclic coefficient for the same vertical motion.

The image processing apparatus according to claim 1 may further include reliability detection means for detecting a reliability of the motion vector, and adjusting means for adjusting the first cyclic coefficient and the second cyclic coefficient on the basis of the reliability of the motion vector.

The reliability detection means may detect, as the reliability of the motion vector, a first motion distribution representing a degree of distribution of each motion vector in relation to surrounding motion vectors. The adjusting means may adjust the first cyclic coefficient and the second cyclic coefficient to be smaller as the first motion distribution becomes greater.

The reliability detection means may detect, as the reliability of the motion vector, a second motion distribution representing a degree of distribution of each motion vector of a current frame in relation to surrounding motion vectors of one frame before the current frame located at a position shifted from pixels corresponding to the motion vector by a direction and a distance indicated by the motion vector. The adjusting means may adjust the first cyclic coefficient and the second cyclic coefficient to be smaller as the second motion distribution becomes greater.

The motion vector detection means may detect the motion vector for each block having a predetermined size. The reliability detection means may detect differences between pixel values of pixels in each block of the interlace input image and pixel values of pixels in each block of a past progressive output image which is shifted from the block of the interlace input image by a direction and a distance indicated by the motion vector. The adjusting means may adjust the first cyclic coefficient and the second cyclic coefficient to be smaller as the differences become greater.

According to another embodiment of the present invention, there is provided an image processing method for converting an interlace input image into a progressive output image or a program allowing a computer to image processing for converting an interlace input image into a progressive output image. The image processing method or the program includes the steps of converting the interlace input image into a progressive intermediate image, detecting motion vectors of the interlace input image by using, as a minimum unit, a distance shorter than an interval between pixels forming the progressive intermediate image, setting, on the basis of a vertical motion, which is a vertical component of each of the motion vectors, a first cyclic coefficient for a first type of pixel that is located at a position where a pixel forming the interlace input image exists, and a second cyclic coefficient for a second type of pixel, which is located at a position where a pixel forming the interlace input image does not exist, generating a motion-compensated image by motion-compensating a past progressive output image on the basis of the motion vectors, and generating the progressive output image by adding pixel values of the first type of pixels located at corresponding positions of the progressive intermediate image and the motion-compensated image by using the first cyclic coefficient as a weight and by adding pixel values of the second type of pixels located at corresponding positions of the progressive intermediate image and the motion-compensated image by using the second cyclic coefficient as a weight.

According to an embodiment of the present invention, an interlace input image is converted into a progressive intermediate image. Motion vectors of the interlace input image are detected by using, as a minimum unit, a distance shorter than an interval between pixels forming the progressive intermediate image. On the basis of a vertical motion, which is a vertical component of each of the motion vectors, a first cyclic coefficient for a first type of pixel that is located at a position where a pixel forming the interlace input image exists, and a second cyclic coefficient for a second type of pixel, which is located at a position where a pixel forming the interlace input image does not exist are set. A motion-compensated image is generated by motion-compensating a past progressive output image on the basis of the motion vectors. A progressive output image is generated by adding pixel values of the first type of pixels located at corresponding positions of the progressive intermediate image and the motion-compensated image by using the first cyclic coefficient as a weight and by adding pixel values of the second type of pixels located at corresponding positions of the progressive intermediate image and the motion-compensated image by using the second cyclic coefficient as a weight.

According to an embodiment of the present invention, an interlace image can be converted into a progressive image. In particular, an interlace image can be converted into a higher-quality progressive image.

DESCRIPTION OF THE PREFERRED EMBODIMENTS

Figure 1:
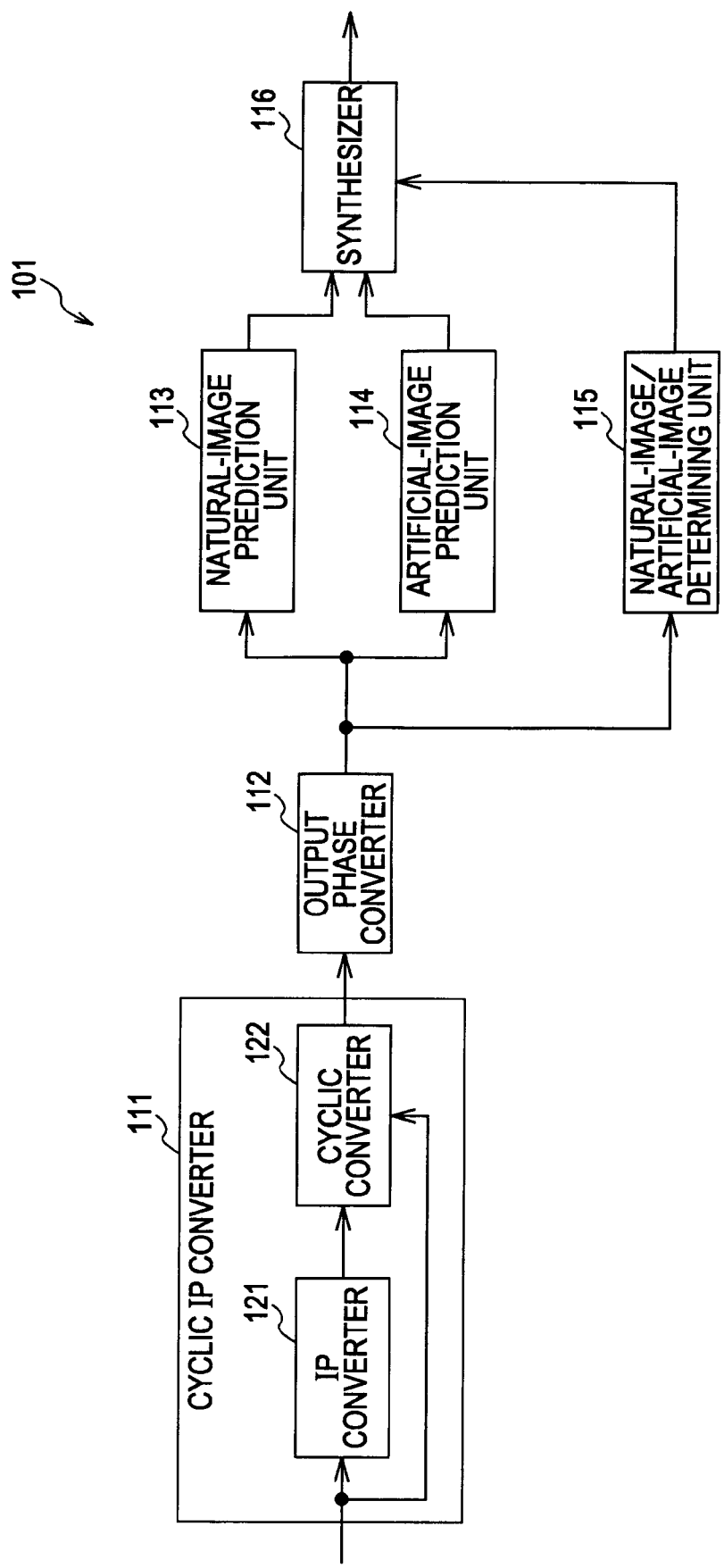
FIG. 1 is a block diagram illustrating the configuration of an image conversion device according to an embodiment of the present invention.

Before describing an embodiment of the present invention, the correspondence between the features of the claims and the embodiment disclosed in the present invention is discussed below. This description is intended to assure that the embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

An image processing apparatus (e.g., a cyclic IP converter 111 shown in FIG. 2) according to an embodiment of the present invention converts an interlace input image (e.g., an image I1) into a progressive output image (e.g., an image P2). The image processing apparatus includes IP conversion means (e.g., an IP converter 121 shown in FIG. 2) for converting the interlace input image into a progressive intermediate image (e.g., an image P1), motion-vector detection means (e.g., a motion vector detector 131 shown in FIG. 2) for detecting motion vectors (e.g., motion vectors V) of the interlace input image by using, as a minimum unit, a distance shorter than an interval between pixels forming the progressive intermediate image, cyclic-coefficient setting means (e.g., a cyclic-coefficient setting unit 133 shown in FIG. 2) for setting, on the basis of a vertical motion (e.g., a vertical motion VY), which is a vertical component of each of the motion vectors, a first cyclic coefficient (e.g., a cyclic coefficient KA0) for a first type of pixel (e.g., an A type pixel) that is located at a position where a pixel forming the interlace input image exists, and a second cyclic coefficient (e.g., a cyclic coefficient KB0) for a second type of pixel (e.g., a B type pixel), which is located at a position where a pixel forming the interlace input image does not exist, motion compensation means (e.g., a motion compensator 134 shown in FIG. 2) for motion-compensating, on the basis of the motion vectors, a past progressive output image (e.g., an image P3) to generate a motion-compensated image (e.g., an image P4), and output image generating means (e.g., a product sum computation unit 135 shown in FIG. 2) for generating the progressive output image by adding pixel values of the first type of pixels located at corresponding positions of the progressive intermediate image and the motion-compensated image by using the first cyclic coefficient as a weight and by adding pixel values of the second type of pixels located at corresponding positions of the progressive intermediate image and the motion-compensated image by using the second cyclic coefficient as a weight.

Figure 5:
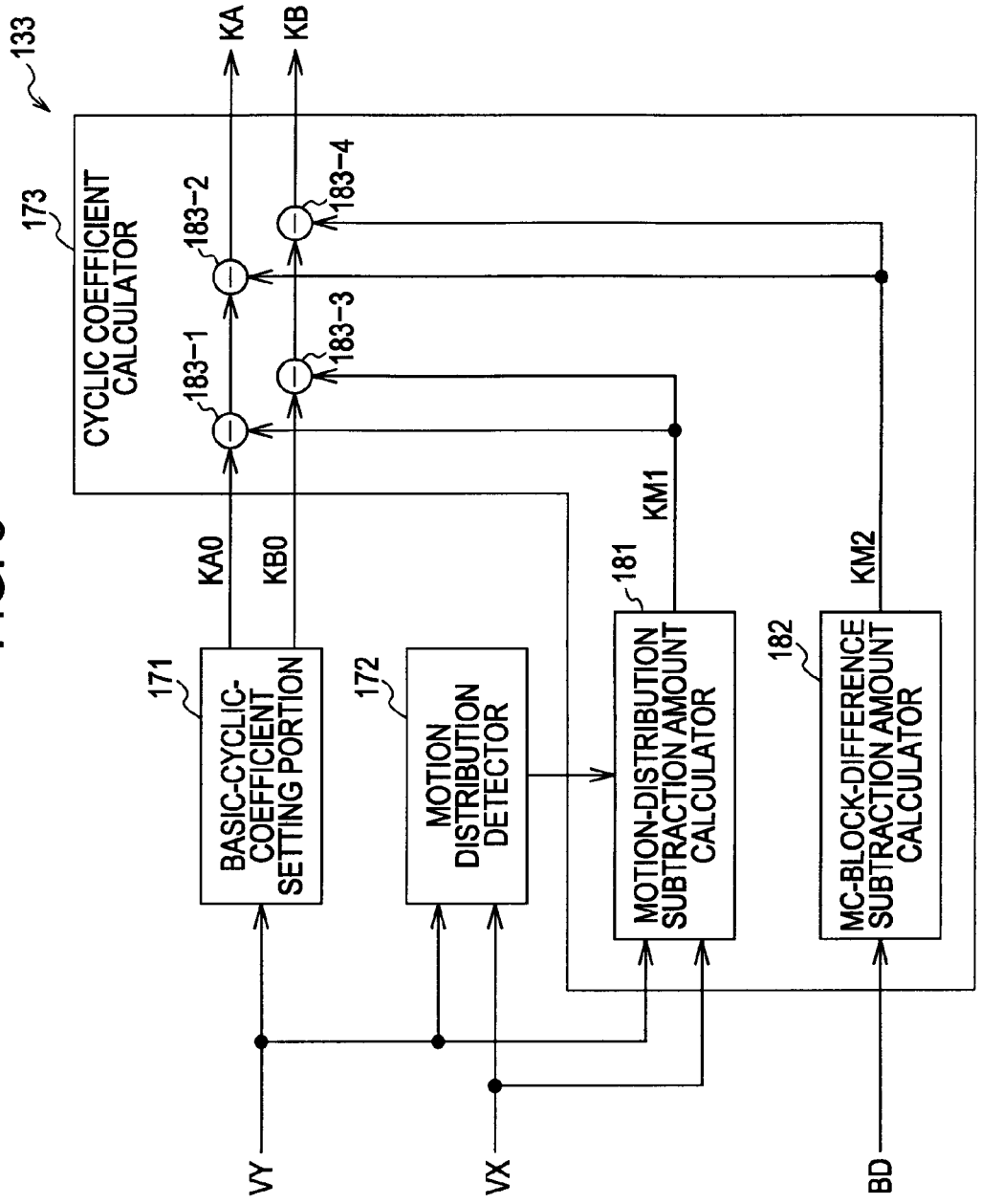
FIG. 5 is a block diagram illustrating the functional configuration of a cyclic-coefficient setting unit shown in FIG. 2.

An image processing apparatus according to an embodiment of the present invention further includes reliability detection means (e.g., a motion-distribution subtraction amount calculator 181 or an MC-block-difference subtraction amount calculator 182 shown in FIG. 5) for detecting a reliability of the motion vector, and adjusting means (e.g., subtractors 183-1 and 183-3 or subtractors 183-2 and 183-4 shown in FIG. 5) for adjusting the first cyclic coefficient and the second cyclic coefficient on the basis of the reliability of the motion vector.

Figure 8:
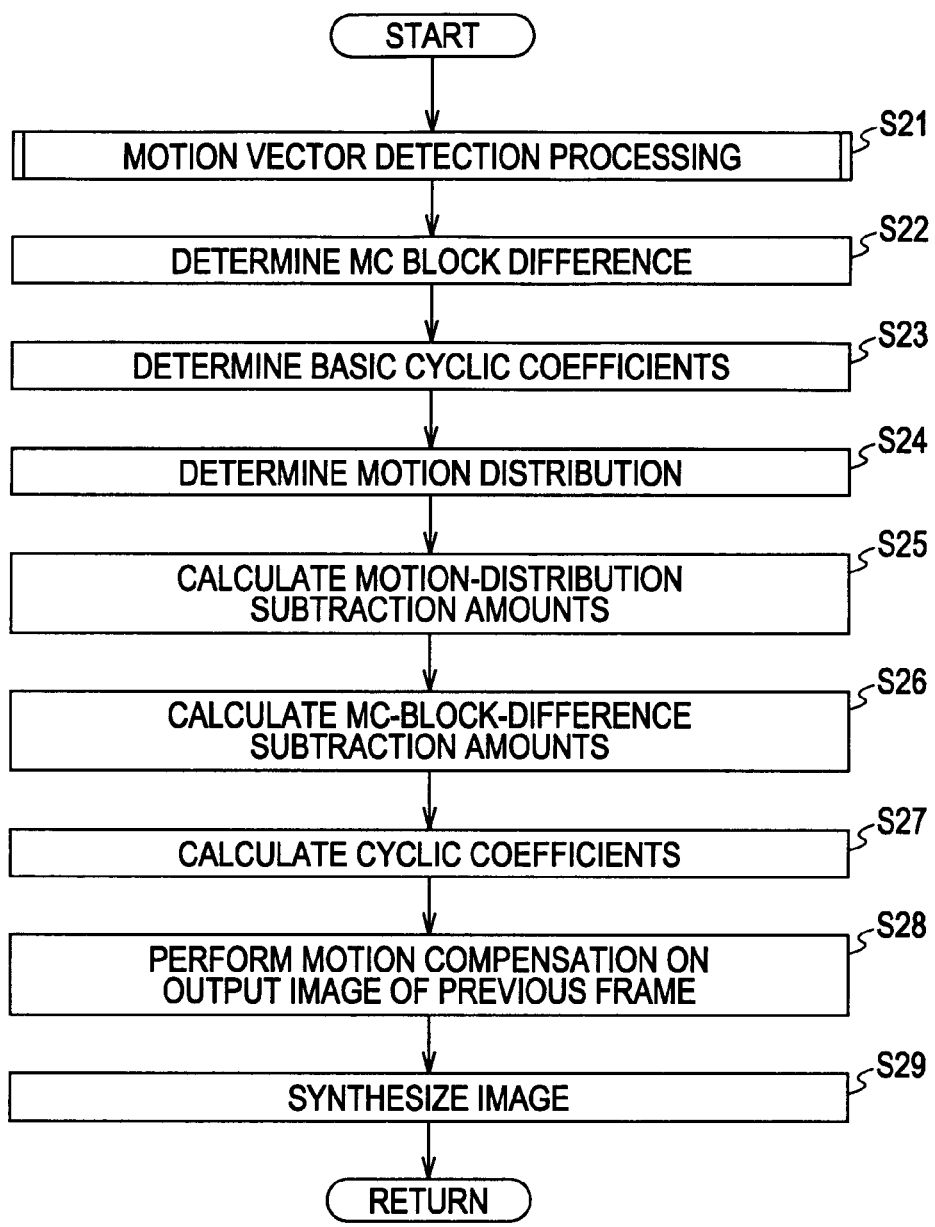
FIG. 8 is a flowchart illustrating details of cyclic conversion processing in step S2 in FIG. 6.

According to another embodiment of the present invention, there is provided an image processing method for converting an interlace input image (e.g., an image I1) into a progressive output image (e.g., an image P2) or a program allowing a computer to execute image processing for converting an interlace input image (e.g., an image I1) into a progressive output image (e.g., an image P2), comprising the steps of converting the interlace input image into a progressive intermediate image (e.g., an image p1) (e.g., step S1 in FIG. 6), detecting motion vectors (e.g., motion vectors V) of the interlace input image by using, as a minimum unit, a distance shorter than an interval between pixels forming the progressive intermediate image (e.g., step S21 in FIG. 8), setting, on the basis of a vertical motion (e.g., a vertical motion VY), which is a vertical component of each of the motion vectors, a first cyclic coefficient (e.g., a cyclic coefficient KA0) for a first type of pixel (e.g., an A type pixel) that is located at a position where a pixel forming the interlace input image exists, and a second cyclic coefficient (e.g., a cyclic coefficient KB0) for a second type of pixel (e.g., a B type pixel), which is located at a position where a pixel forming the interlace input image does not exist (e.g., step S23 in FIG. 8), generating a motion-compensated image (e.g., an image P4) by motion-compensating a past progressive output image (e.g., an image P3) on the basis of the motion vectors (e.g., step S28 in FIG. 8), and generating the progressive output image by adding pixel values of the first type of pixels located at corresponding positions of the progressive intermediate image and the motion-compensated image by using the first cyclic coefficient as a weight and by adding pixel values of the second type of pixels located at corresponding positions of the progressive intermediate image and the motion-compensated image by using the second cyclic coefficient as a weight (e.g., step S29 in FIG. 8).

Embodiments of the present invention are described below with reference to the drawings.

FIG. 1 is a block diagram illustrating an image conversion device 101 according to an embodiment of the present invention. The image conversion device 101 includes a cyclic interlace/progressive (IP) converter 111, an output phase converter 112, a natural-image prediction unit 113, an artificial-image prediction unit 114, a natural-image/artificial-image determining unit 115, and a synthesizer 116. The cyclic IP converter 111 includes an IP converter 121 and a cyclic converter 122.

An interlace SD image to be processed is input into the IP converter 121 and the cyclic converter 122 of the cyclic IP converter 111.

The IP converter 121 converts the input interlace SD image (hereinafter also referred to as an "input image") into a progressive SD image (hereinafter also referred to as an "intermediate image") according to a predetermined method, and supplies the converted progressive SD image to the cyclic converter 122.

The cyclic converter 122 determines motion vectors between the input image and the progressive SD image of the previous frame (one frame before) output from the cyclic converter 122 (such an image is also referred to as an "output image"). The cyclic converter 122 then adds the pixel values of the output image motion-compensated based on the determined motion vectors to the pixel values of the input image by using cyclic coefficients as weights, thereby improving the intermediate image. That is, the cyclic converter 122 converts the intermediate image into an output image, which is a progressive SD image of a quality higher than the intermediate image, and supplies the resulting output image to the output phase converter 112. The cyclic coefficients are set based on whether each pixel of the intermediate image exists in the original input image and also based on the magnitudes of the motion vectors in the vertical direction and the reliabilities indicating the probabilities of the motion vectors.

The output phase converter 112 interpolates the SD image supplied from the cyclic converter 122 in the horizontal and vertical directions to generate an HD image. The second pixel number is greater than the first pixel number. The output phase converter 112 then supplies the HD image to the natural-image prediction unit 113, the artificial-image prediction unit 114, and the natural-image/artificial-image determining unit 115.

The natural-image prediction unit 113 predicts, from the HD image supplied from the output phase converter 112, a high-quality HD image which can be obtained by increasing the quality of natural image components contained in the input HD image (such a high-quality HD image is hereafter referred to as a "high-quality natural image"). More specifically, in accordance with the features of the input HD image, the natural-image prediction unit 113 allocates the subject pixels into classes optimal for the features of the natural image. Then, the natural-image prediction unit 113 performs computation by using the input HD image and prediction coefficients corresponding to the classes, which are used for predicting the high-quality natural image, to predict the high-quality natural image from the input HD image. The natural-image prediction unit 113 supplies the computed high-quality natural image to the synthesizer 116.

Natural images are images which are not artificial images, which are discussed below, and are images obtained by directly imaging subjects in nature.

As in the natural-image prediction unit 113, the artificial-image prediction unit 114 predicts, from the HD image supplied from the output phase converter 112, a high-quality HD image which can be obtained by increasing the quality of artificial image components contained in the input HD image (such a high-quality HD image is hereafter referred to as a "high-quality artificial image"). More specifically, in accordance with the features of the input HD image, the artificial-image prediction unit 114 allocates the pixels forming the high-quality artificial image to be determined from the input HD image into classes optimal for the features of the artificial image. Then, the artificial-image prediction unit 132 performs computation by using the input HD image and prediction coefficients corresponding to the classes, which are used for predicting the high-quality artificial image, to predict the high-quality artificial image from the input HD image. The artificial-image prediction unit 114 supplies the computed high-quality artificial image to the synthesizer 116.

Artificial images are images, for example, text or simple graphics, exhibiting a small number of grayscale levels and distinct phase information concerning edges (outlines), i.e., including many flat portions.

The natural-image/artificial-image determining unit 115 determines for each pixel of the HD image supplied from the output phase converter 112 whether it belongs to an artificial image area or a natural image area, and outputs determination results to the synthesizer 116 as the degrees of artificiality. That is, the degree of artificiality represents the ratio of artificial image components to natural image components in an intermediate area, which is between the artificial image area and the natural image area, by a value from 0 to 1.

The synthesizer 116 combines, based on the determination results supplied from the natural-image/artificial-image determining unit 115, the pixel values of the pixels forming the high-quality natural image supplied from the natural-image prediction unit 113 with the pixel values of the pixels forming the high-quality artificial image supplied from the artificial-image prediction unit 114 in accordance with the degrees of artificiality of the individual pixels. The synthesizer 116 then outputs the synthesized HD image.

Figure 2:
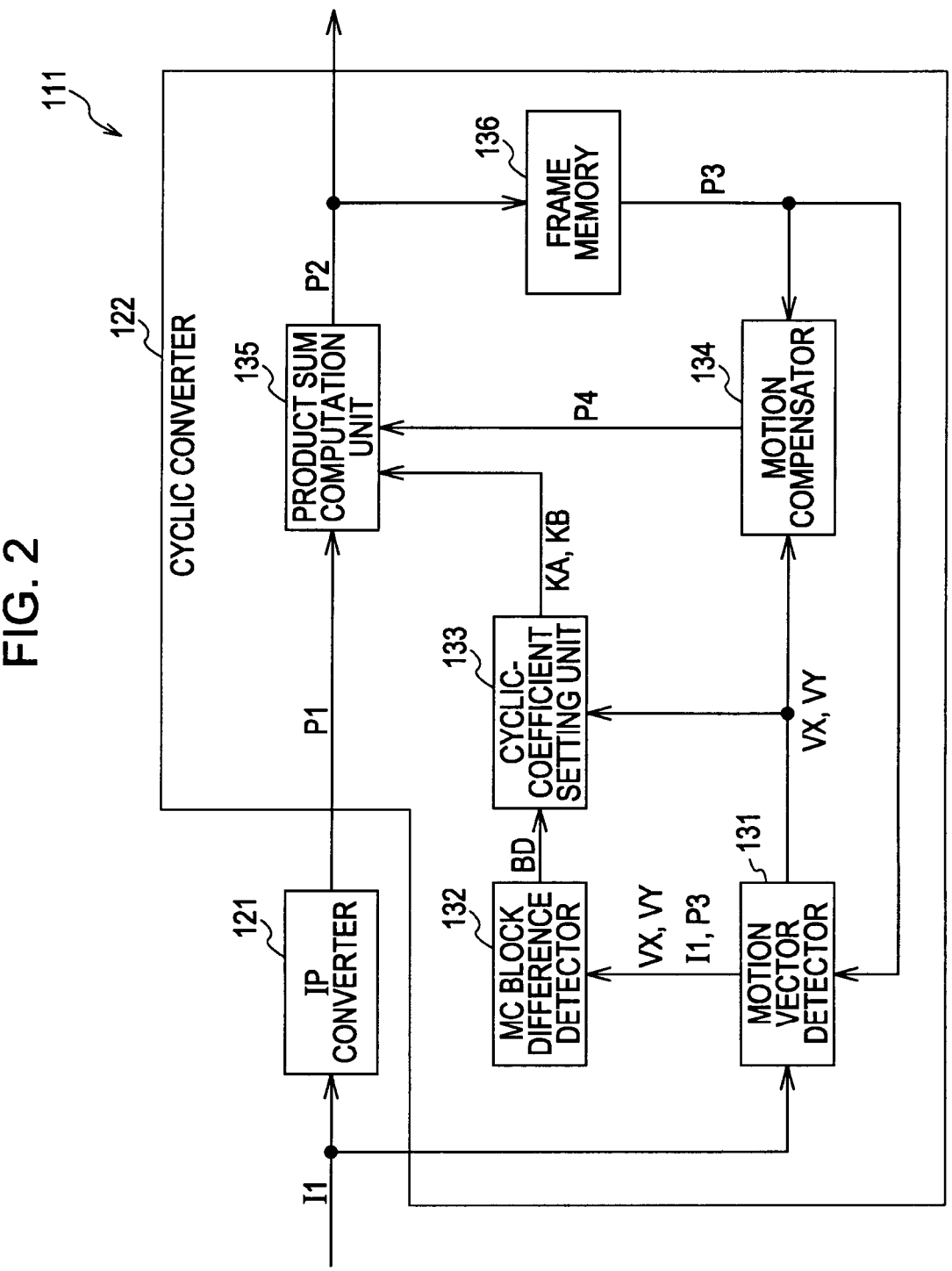
FIG. 2 is a block diagram illustrating the functional configuration of a cyclic interlace/progressive (IP) converter shown in FIG. 1.

FIG. 2 illustrates details of the functional configuration of the cyclic converter 122 of the cyclic IP converter 111 shown in FIG. 1. The cyclic converter 122 includes a motion vector detector 131, a motion compensation (MC) difference detector 132, a cyclic-coefficient setting unit 133, a motion compensator 134, a product sum computation unit 135, and a frame memory 136.

In the coordinate system representing the positions of the pixels of each image to be processed by the cyclic IP converter 111, the x axis indicates the horizontal direction and the y axis represents the vertical direction. That is, the coordinates of each pixel are represented by (x, y). An input image, which is an interlace SD image input into the IP converter 121, from an external source is also referred to as an "image I1", and an intermediate image, which is a progressive SD image output from the IP converter 121, is also referred to as an "image P1".

Generally, a progressive image includes two types of pixels, i.e., pixels that exist in an interlace image before conducting IP conversion and pixels that do not exist in the interlace image. If the two types of pixels are distinguished from each other, the former type is referred to as "A type pixels" and the latter type is referred to as "B type pixels".

Figure 3:
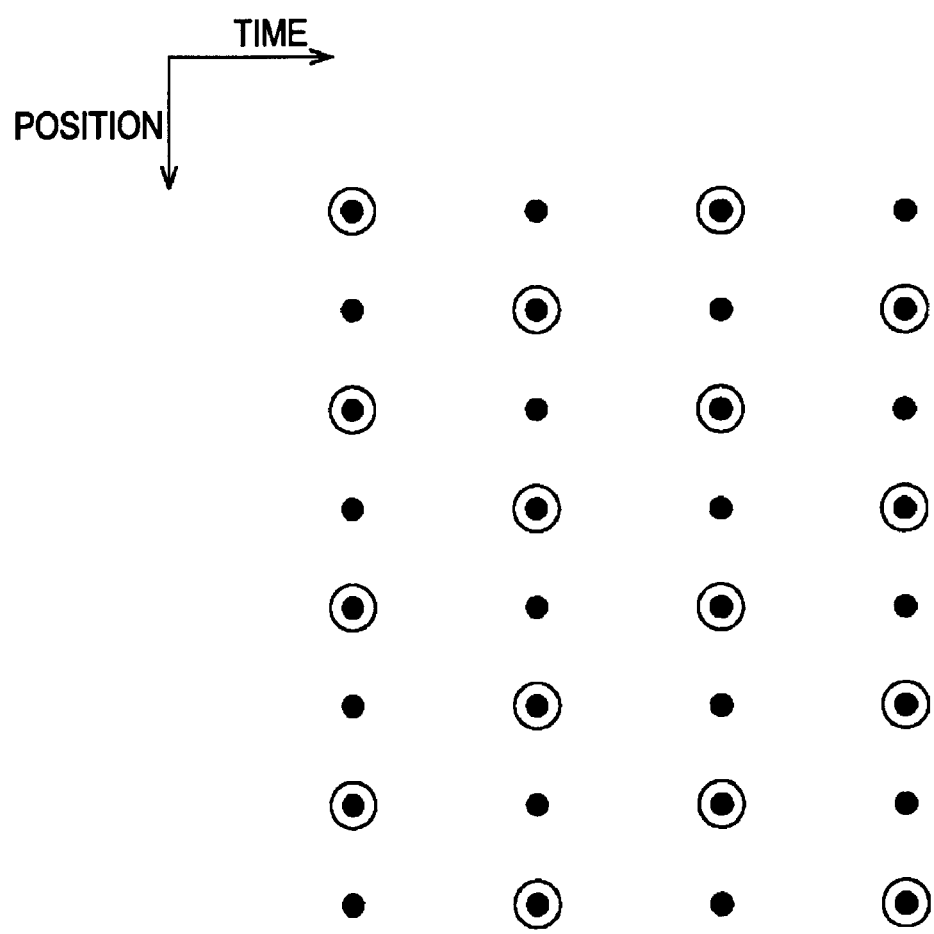
FIG. 3 illustrates pixel types of a progressive image.

FIG. 3 illustrates the positional relationship between an interlace image before conducting IP conversion and a progressive image after conducting IP conversion. In FIG. 3, the horizontal axis indicates the time, and the vertical axis designates the position of the pixels. In FIG. 3, the pixels indicated by the black circles surrounded by the white circles represent A type pixels, and the pixels indicated only by the black circles represent B type pixels.

The motion vector detector 131 detects a motion vector of each pixel forming an image I1. More specifically, the motion vector detector 131 reads out, from the frame memory 136, an output image (which is also referred to as the "image P3"), which is a progressive SD image, of the previous frame output from the cyclic converter 122 and stored in the frame memory 136. The motion vector detector 131 divides the image I1, as discussed below with reference to FIG. 18, into a predetermined size of blocks, i.e., N-row×M-column pixel blocks, and then, detects motion vectors with sub-pixel precision, i.e., by using, as the minimum unit, an interval smaller than the interval between pixels of the progressive image. For B type pixels that do not exist in the image I1, the motion vector of a B type pixel cannot be detected, and thus, the motion vector of a block containing that B type pixel is used.

To distinguish the coordinate system representing the positions of a predetermined block of each image from the coordinate system representing the position of the pixels, the horizontal direction is designated by the X axis, and the vertical direction is represented by the Y axis. That is, the coordinates of each block are represented by (X, Y). The motion vector of a block at the coordinates (X, Y) is indicated by V(X, Y), and the horizontal motion, which is a horizontal component, of the motion vector V(X, Y) is represented by VX(X, Y), while the vertical motion, which is a vertical component, of the motion vector V(X, Y) is designated by VY(X, Y). The amounts of horizontal motion and vertical motion are represented based on the pixel interval in the progressive image. The pixel at the top left of each block is referred to as the "reference pixel", and the coordinates of the reference pixel are referred to as the "reference coordinates".

The motion vector detector 131 supplies information indicating the detected motion vector V (including the horizontal motion VX and the vertical motion VY) to the MC block difference detector 132, the cyclic-coefficient setting unit 133, and the motion compensator 134. The motion vector detector 131 also supplies the image I1 and the image P3 used for detecting the motion vector to the MC block difference detector 132.

The MC block difference detector 132 detects, as discussed below with reference to FIGS. 9 and 10, MC block differences, which are the differences between the pixel values of the pixels of each block of the image I1 and the pixel values of the pixels of the corresponding block of the image P3, which is shifted from the block of the image I1 by the direction and distance indicated by the motion vector V. The MC block difference detector 132 supplies information indicating the detected MC block differences to the cyclic-coefficient setting unit 133.

The MC block difference of the block positioned at the coordinates (X, Y) is hereinafter indicated by BD(X, Y).

The cyclic-coefficient setting unit 133 sets, as discussed below with reference to FIG. 8, cyclic coefficients KA for the A type pixels and cyclic coefficients KB for the B type pixels on the basis of the motion vector V and the MC block difference BD. The cyclic coefficient KA for the A type pixel positioned at the coordinates (x, y) is indicated by KA(x, y), and the cyclic coefficient KB for the B type pixel positioned at the coordinates (x, y) is designated by KB (x, y). The cyclic-coefficient setting unit 133 supplies information indicating the set cyclic coefficients KA and KB to the product sum computation unit 135.

The motion compensator 134 reads out the image P3 from the frame memory 136. The motion compensator 134, as discussed below with reference to FIG. 8, performs motion compensation on the image P3 based on the motion vector V to generate an image P4. The motion compensator 134 then supplies the generated image P4 to the product sum computation unit 135.

The product sum computation unit 135 generates, as discussed below with reference to FIG. 10, an output image (hereinafter also referred to as the "image P2), which is a progressive SD image, by adding the pixel values of the A type pixels located at corresponding positions of the image P1 and the image P4 by using the cyclic coefficients KA as weights, and also by adding the pixel values of the B type pixels located at corresponding positions of the image P1 and the image P4 by using the cyclic coefficients KB as weights. The product sum computation unit 135 supplies the image P2 to the output phase converter 112 and also stores the image P2 in the frame memory 136.

The pixel values of the pixels positioned at the coordinates (x, y) of the image I1 and the images P1 through P4 are represented by I1(x, y) and P1(x, y) through P4(x, y), respectively.

Figure 4:
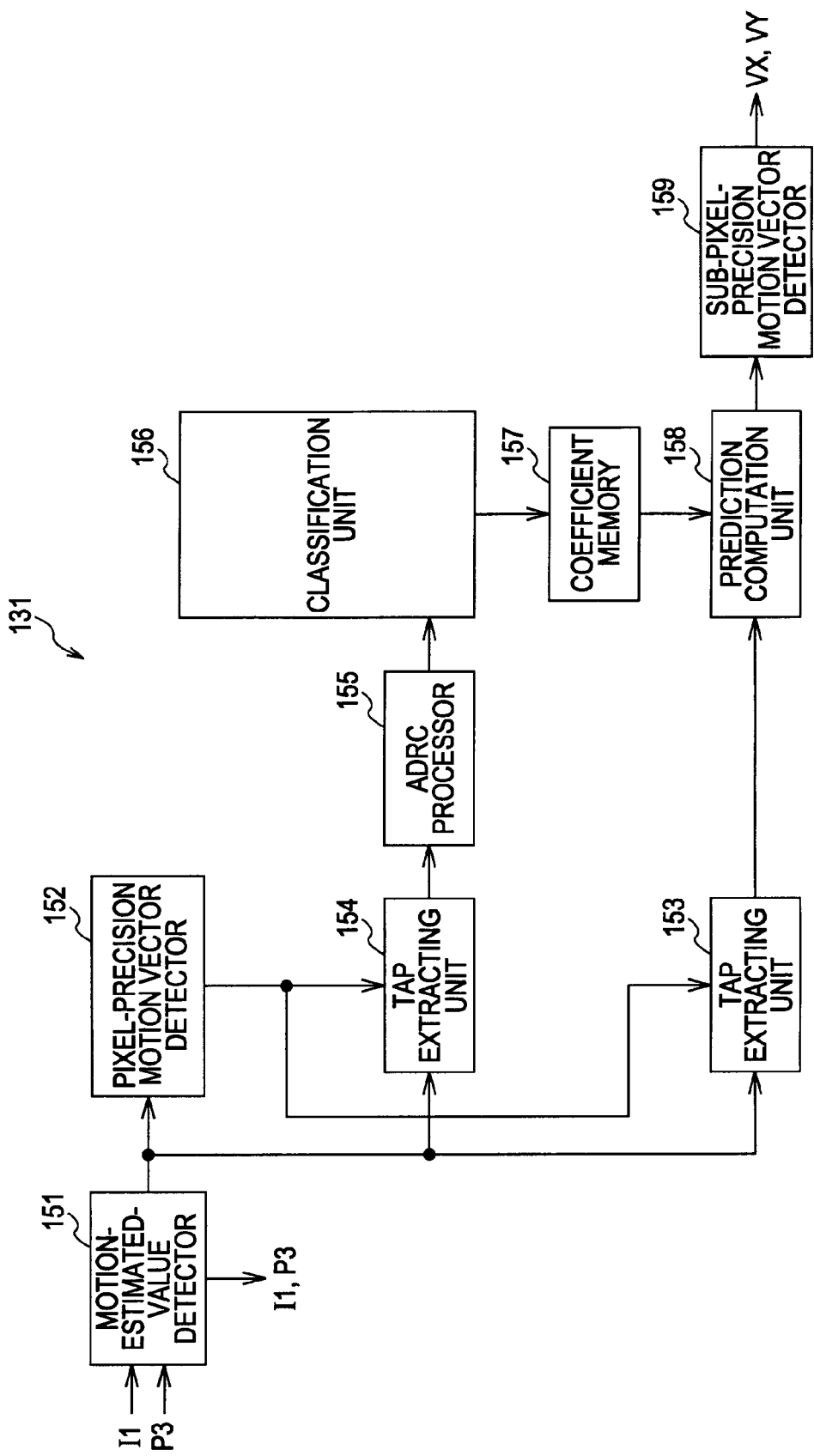
FIG. 4 is a block diagram illustrating the functional configuration of a motion vector detector shown in FIG. 2.

FIG. 4 is a block diagram illustrating the functional configuration of the motion vector detector 131. The motion vector detector 131 includes a motion-estimated-value detector 151, a pixel-precision motion vector detector 152, tap extracting units 153 and 154, an ADRC processor 155, a classification unit 156, a coefficient memory 157, a prediction computation unit 158, and a sub-pixel-precision motion vector detector 159.

The motion-estimated-value detector 151 obtains the image I1 input from an external source and also obtains the image P3 from the frame memory 136. The motion-estimated-value detector 151 then divides the image I1 into a predetermined size of blocks, and sequentially sets the divided blocks as subject blocks. The motion-estimated-value detector 151 then sequentially sets, as discussed below with reference to FIG. 18, pixels in a predetermined area of the image P3 as subject pixels, and determines differences of the pixel values of the pixels of a block (hereinafter referred to as a "comparative block") having the same size as the subject block and including the subject pixel as the reference pixel and the pixel values of the pixels of the subject block located at the corresponding positions. The motion-estimated-value detector 151 then adds the absolute values of the determined differences, and sets the added result as the motion estimated value for the subject pixel. The motion-estimated-value detector 151 supplies information indicating the detected motion estimated value to the pixel-precision motion vector detector 152 and the tap extracting units 153 and 154. The motion-estimated-value detector 151 also supplies the image I1 and the image P3 used for detecting the motion vector to the MC block difference detector 132.

The motion estimated value for the subject pixel positioned at the coordinates (x, y) is hereinafter indicated by M(x, y).

Figure 18:
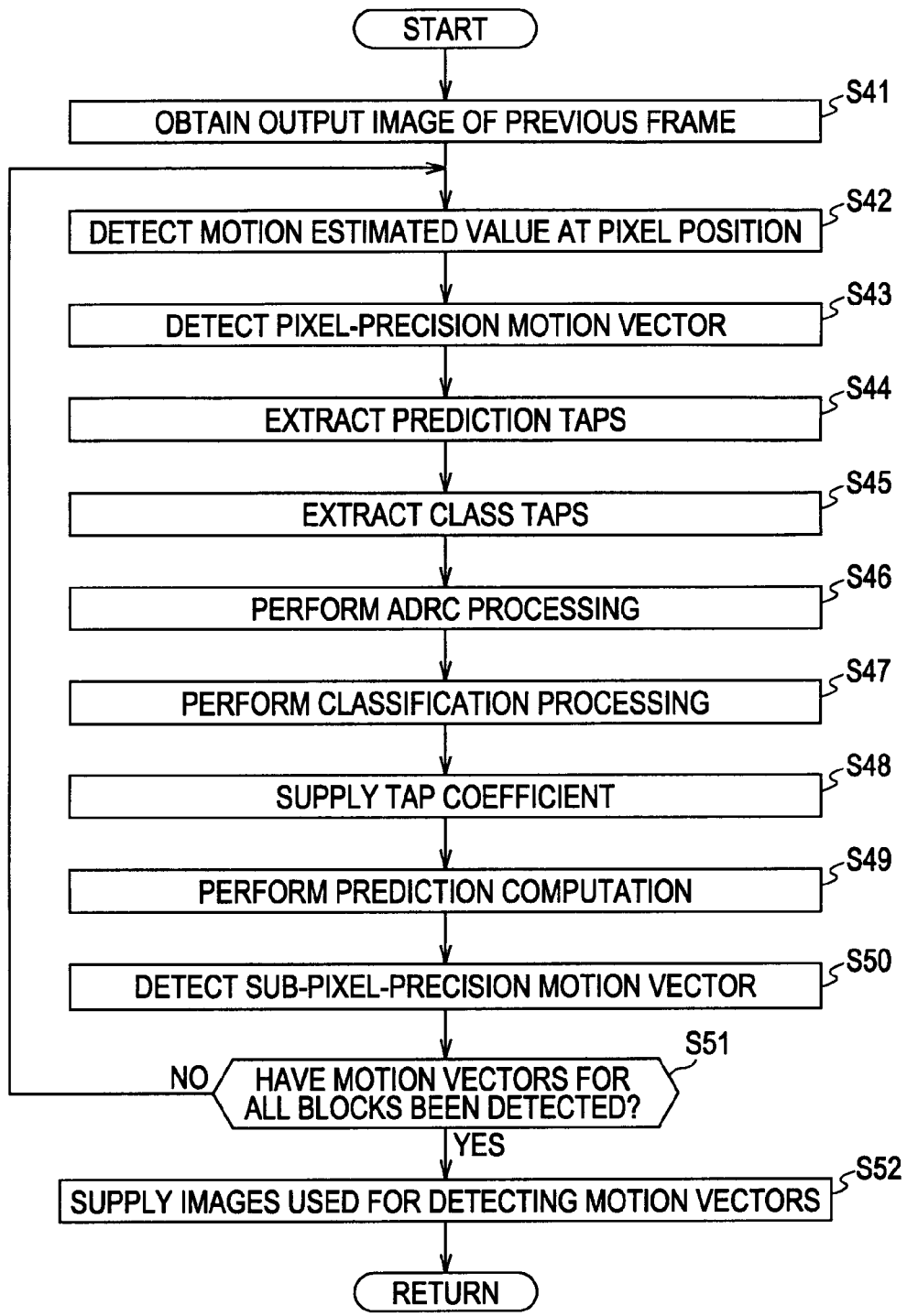
FIG. 18 is a flowchart illustrating details of motion vector detection processing in step S21 in FIG. 8.

The pixel-precision motion vector detector 152 detects, as discussed below with reference to FIG. 18, the vector that connects the coordinates of the pixel having the smallest motion estimated value (hereinafter such a pixel is referred to as the "minimum estimated value pixel") M with the coordinates of the reference pixel of the subject block, as the motion vector using an interval equal to the pixel interval of the progressive image, i.e., the pixel precision for the subject block, as the minimum unit. The pixel-precision motion vector detector 152 supplies information indicating the detected pixel-precision motion vector to the tap extracting units 153 and 154.

The tap extracting unit 153 extracts, as discussed below with reference to FIG. 18, as prediction taps, the motion estimated values M for pixels near the minimum estimated value pixel (including the minimum estimated value pixel itself) of the image P3. Such pixels are used for predicting the motion estimated values M at the positions between the minimum-estimated pixel and the adjacent pixels, i.e., at the sub-pixel precision positions (hereinafter also referred to as the "prediction positions"). The tap extracting unit 153 supplies the extracted prediction taps to the prediction computation unit 158.

The tap extracting unit 154 extracts, as discussed below with reference to FIG. 18, as class taps, the motion estimation values M for several pixels of the image P3 used for classifying the minimum estimated value pixel into one of the classes. The tap extracting unit 154 supplies the extracted class taps to the ADRC processor 155.

The ADRC processor 155 performs ADRC processing on the motion estimated values M forming the class taps and supplies information indicating the resulting ADRC code to the classification unit 156.

In K-bit ADRC processing, the maximum value MAX and the minimum value MIN of the motion estimated values M of the pixels forming the class taps are detected, and DR=MAX−MIN is set as the local dynamic range of a set, and then, the motion estimated values M forming the class taps are re-quantized into K bits based on the dynamic range. That is, the minimum value MIN is subtracted from each motion estimated value M and the resulting value is divided by $DR/2^K$. Then, the motion estimated values M of the K-bit pixel values of the pixels forming the class taps are arranged in a predetermined order, resulting in a bit string, which is then output as the ADRC code.

The classification unit 156 classifies the minimum estimated value pixel based on the ADRC code supplied from the ADRC processor 155, and then supplies information indicating the class code corresponding to the resulting class to the coefficient memory 157.

The coefficient memory 157 stores a set of tap coefficients for the individual classes, which are predetermined by learning discussed below. The coefficient memory 157 extracts, from the stored set of tap coefficients, the tap coefficient stored at the address associated with the class code supplied from the classification unit 156, i.e., the tap coefficient for the class represented by the class code supplied from the classification unit 156, and then supplies the extracted tap coefficient to the prediction computation unit 158.

The prediction computation unit 158 obtains, as discussed below with reference to FIG. 18, the prediction taps output from the tap extracting unit 153 and the tap coefficient output from the coefficient memory 157, and then performs predetermined prediction computation for determining the prediction values of the true values of the motion estimated values M at the prediction positions by using the prediction taps and the tap coefficient. As a result, the prediction computation unit 158 determines the prediction values of the motion estimation values M' at the prediction positions and supplies the prediction values to the sub-pixel-precision motion vector detector 159.

The sub-pixel-precision motion vector 159 detects the pixel or the position having the minimum motion estimated value from the minimum estimated value pixels and the prediction positions, and then, determines, as the sub-pixel-precision motion vector V, the vector that connects the coordinates of the detected pixel or position with the coordinates of the reference pixel of the subject block. The sub-pixel-precision motion vector 159 then supplies information indicating the detected motion vector V to the MC block difference detector 132, the cyclic-coefficient setting unit 133, and the motion compensator 134.

FIG. 5 is a block diagram illustrating the functional configuration of the cyclic-coefficient setting unit 133. The cyclic-coefficient setting unit 133 includes a basic-cyclic-coefficient setting unit 171, a motion distribution detector 172, and a cyclic coefficient calculator 173. The cyclic coefficient calculator 173 includes a motion-distribution subtraction amount calculator 181, an MC-block-difference subtraction amount calculator 182, and subtractors 183-1 through 183-4.

The basic-cyclic-coefficient setting unit 171 sets, as discussed below with reference to FIGS. 11 and 12, basic cyclic coefficients KA0 for A type pixels of the image P1 and basic cyclic coefficients KB0 for B type pixels of the image P1 on the basis of the vertical motion VY. The basic cyclic coefficient KA0 for the pixel positioned at the coordinates (x, y) is represented by KA0($x, y$), and the basic cyclic coefficient KB0 for the pixel positioned at the coordinates (x, y) is designated by KB0($x, y$). The basic-cyclic-coefficient setting unit 171 supplies information indicating the basic cyclic coefficients KA0 and information indicating the basic cyclic coefficients KB0 to the subtractor 183-1 and the subtractor 183-3, respectively.

The motion distribution detector 172 detects, as discussed below with reference to FIGS. 14 and 17, as the reliability of the motion vector V detected by the motion vector detector 131, the motion distribution MD representing the degree of distribution of the motion vector V in relation to the surrounding motion vectors V. The motion distribution MD for the motion vector V(X, Y) is indicated by MD(X, Y). The motion distribution detector 172 supplies information indicating the motion distribution MD to the motion-distribution subtraction amount calculator 181.

The motion-distribution subtraction amount calculator 181 calculates, as discussed below with reference to FIG. 8, motion-distribution subtraction amounts KM1, which are correction values for correcting for the basic cyclic coefficients KA0 and KB0, on the basis of the motion distributions MD. The motion-distribution subtraction amount KM1 for the pixel positioned at the coordinates (x, y) of the image P1 is designated by KM1($x, y$). The motion-distribution subtraction amount calculator 181 supplies information indicating the motion-distribution subtraction amounts KM1 to the subtractors 183-1 and 183-3.

The MC-block-difference subtraction amount calculator 182 calculates, as discussed below with reference to FIG. 8, MC-block-difference subtraction amounts KM2, which are correction values for correcting for the basic cyclic coefficients KA0 and KB0, on the basis of the MC block differences BD. The motion-distribution subtraction amount KM2 for the pixel positioned at the coordinates (x, y) of the image P1 is designated by KM2($x, y$). The MC-block-difference subtraction amount calculator 182 supplies information indicating the MC-block-difference subtraction amounts KM2 to the subtractors 183-2 and 183-4.

The subtractor 183-1 subtracts the motion-distribution subtraction amount KM1 from the basic cyclic coefficient KA0, and the subtractor 183-2 subtracts the MC-block-difference subtraction amount KM2 from the value output from the subtractor 183-1, resulting in the cyclic coefficient KA. The cyclic coefficient KA for the pixel positioned at the coordinates (x, y) of the image P1 is represented by KA(x, y). The subtractor 183-2 supplies information indicating the cyclic coefficient KA to the product sum computation unit 135.

The subtractor 183-3 subtracts the motion-distribution subtraction amount KM1 from the basic cyclic coefficient KB0, and the subtractor 183-4 subtracts the MC-block-difference subtraction amount KM2 from the value output from the subtractor 183-3, resulting in the cyclic coefficient KB. The cyclic coefficient KB for the pixel positioned at the coordinates (x, y) of the image P1 is represented by KB(x, y). The subtractor 183-4 supplies information indicating the cyclic coefficient KB to the product sum computation unit 135.

The image conversion processing performed by the image conversion device 101 is described below with reference to the flowchart in FIG. 6. This processing is started, for example, when the input of an image I1 from an external source is started.

In step S1, the IP converter 121 performs IP conversion processing. More specifically, the IP converter 121 converts an interlace image I1 input from an external source into an image P1. Motion-adaptation IP conversion processing, which is one type of IP conversion processing, performed by the IP converter 121 is described below with reference to FIG. 7.

Figure 7:
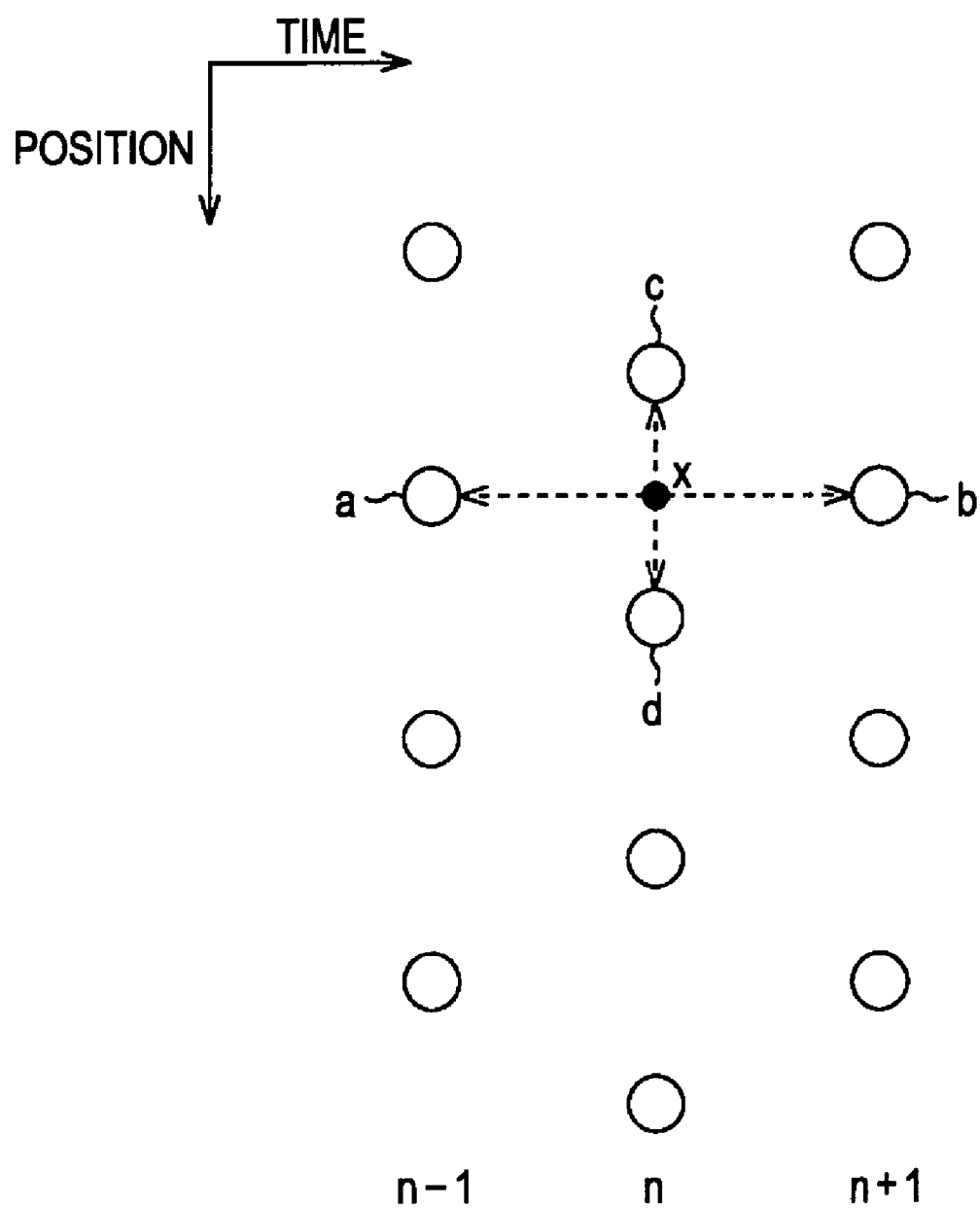
FIG. 7 illustrates IP conversion processing using a motion adaptation technique.

FIG. 7 illustrates the vertical arrangement of pixels of an interlace image. In FIG. 7, the horizontal axis designates the time, and the vertical axis represents the position of the pixels. In FIG. 7, the white circles indicate pixels. The pixel column at the left side belongs to the (n−1)-th field, the pixel column in the middle belongs to the n-th field, and the pixel column at the right side belongs to the (n+1)-th field.

The calculation of the pixel value of a pixel (B type pixel) to be interpolated at position x when the n-th field interlace image is converted into a progressive image is discussed below by way of example. It is now assumed that in the (n−1)-th field, the pixel value of the pixel located at a position corresponding to the position x is a, and in the (n+1)-th field, the pixel value of the pixel located at a position corresponding to the position x is b. It is also assumed that in the n-th field, the pixel values of the pixels immediately above and below the position x are c and d, respectively.

For example, if |a−b|≦|c−d|, it is considered that the position x is contained in a still image area having small motion, and then, the pixel value at the position x is calculated to be (a+b)/2, which is the average of the pixel values of the pixels located at the positions corresponding to the position x in the previous and subsequent fields. Conversely, if |a−b|>|c−d|, it is considered that the position x is contained in a moving image area having large motion, and then, the pixel value at the position x is calculated to be (c+d)/2, which is the average of the pixel values of the pixels vertically and horizontally adjacent to the position x. For other B type pixels, the pixel values may be determined in a manner similar to that described above.

The IP conversion processing performed by the IP converter 121 is not restricted to a particular technique, and may be performed according to another technique, for example, a technique using classification adaptation processing. Details of IP conversion using classification adaptation processing are disclosed in Japanese Unexamined Patent Application Publication No. 2000-50213, which was previously filed by the assignee of this application.

Additionally, image processing, for example, noise suppression, may be performed for improving the quality of an image I1 before performing IP conversion.

The IP converter 121 sequentially supplies the generated images P1 to the product sum computation unit 135.

In step S2, the cyclic converter 122 performs cyclic conversion processing. According to this processing, the image P1 is converted into a higher-quality image P2, which is then supplied to the output phase converter 112. Details of the cyclic conversion processing are discussed below with reference to FIG. 8.

In step S3, the output phase converter 112 performs output phase conversion processing. More specifically, the output phase converter 112 generates an HD image by interpolating an SD image supplied from the cyclic converter 122 in the horizontal and vertical directions. The output phase converter 112 supplies the generated HD image to the natural-image prediction unit 113, the artificial-image prediction unit 114, and the natural-image/artificial-image determining unit 115.

In step S4, the natural-image prediction unit 113 performs natural-image prediction processing. According to this processing, the natural-image prediction unit 113 predicts a high-quality natural image obtained by increasing the quality of the HD image supplied from the output phase converter 112. More specifically, based on the feature of the HD image, the natural-image prediction unit 113 classifies subject pixels, which are pixels forming the high-quality natural image determined from the HD image, into some classes suitable for the features of the natural image. The natural-image prediction unit 113 then executes computation by using the HD image and the prediction coefficient for predicting a high-quality natural image associated with the class to generate the high-quality natural image from the HD image supplied from the output phase converter 112. The natural-image prediction unit 113 then supplies the generated high-quality natural image to the synthesizer 116.

In step S5, the artificial-image prediction unit 114 performs artificial-image prediction processing. According to this processing, as in the natural-image prediction unit 113, the artificial-image prediction unit 114 predicts a high-quality artificial image from the HD image supplied from the output phase converter 112. More specifically, based on the feature of the HD image, the artificial-image prediction unit 114 classifies subject pixels, which are pixels forming the high-quality artificial image determined from the HD image, into some classes suitable for the features of the artificial image. The artificial-image prediction unit 114 then executes computation by using the HD image and the prediction coefficient for predicting a high-quality artificial image associated with the class to generate the high-quality artificial image from the HD image supplied from the output phase converter 112. The artificial-image prediction unit 114 then supplies the generated high-quality artificial image to the synthesizer 116.

In step S6, the natural-image/artificial-image determining unit 115 performs natural-image/artificial-image determination processing. According to this processing, the natural-image/artificial-image determining unit 115 determines whether each pixel of the HD image supplied from the output phase converter 112 belongs to an artificial image area or a natural image area, and outputs determination results to the synthesizer 116 as the degrees of artificiality.

In step S7, the synthesizer 116 synthesizes an image. More specifically, the synthesizer 116 combines, based on determination results supplied from the natural-image/artificial-image determining unit 115, the pixel values of the pixels forming the high-quality natural image supplied from the natural-image prediction unit 113 with the pixel values of the pixels forming the high-quality artificial image supplied from the artificial-image prediction unit 114 in accordance with the degrees of artificiality of the individual pixels. The synthesizer 116 outputs the synthesized HD image to a subsequent device.

If the image conversion processing is continuously performed on a plurality of images, steps S1 through S7 are repeated.

Figure 6:
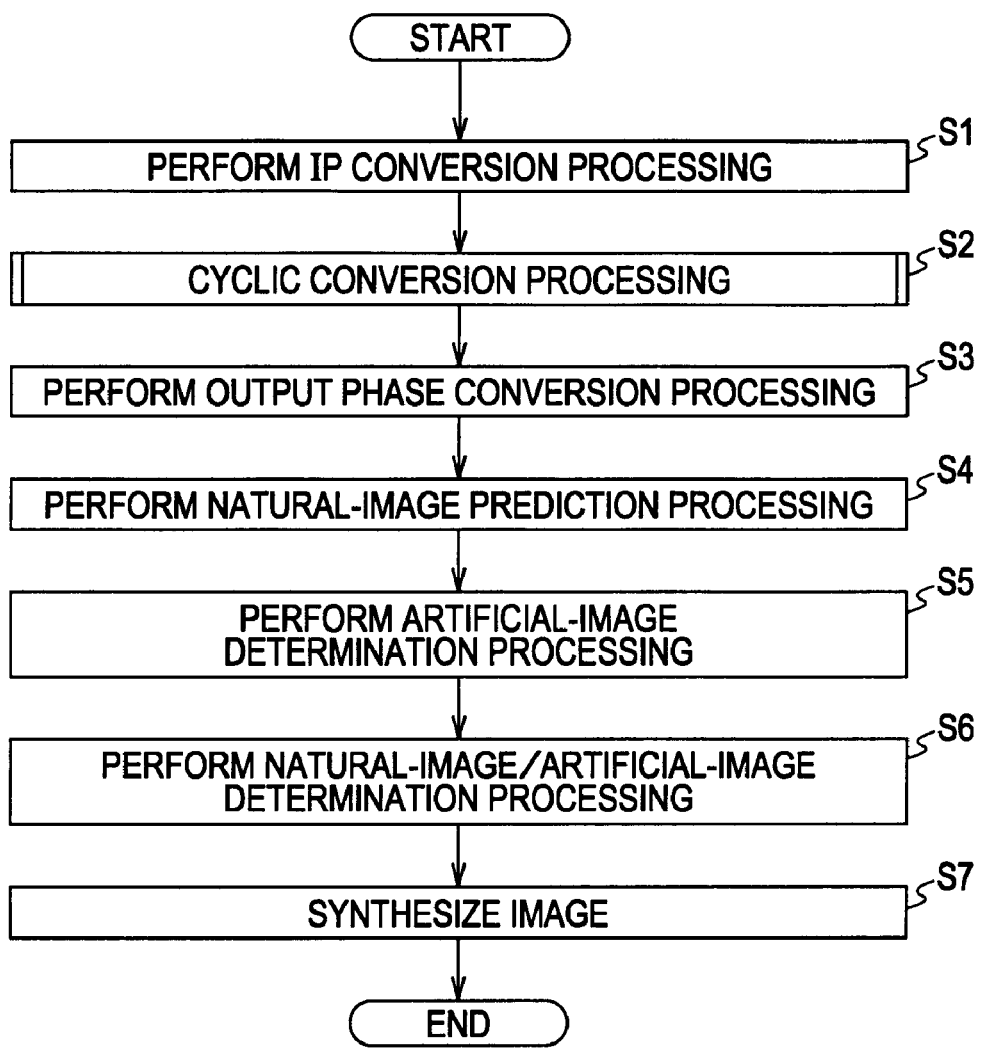
FIG. 6 is a flowchart illustrating image conversion processing performed by the image conversion device shown in FIG. 1.

Details of the cyclic conversion processing in step S2 in FIG. 6 are discussed below with reference to the flowchart in FIG. 8.

In step S21, the motion vector detector 131 performs motion vector detection processing. According to this processing, the sub-pixel-precision motion vector V of each pixel of the image I1 is detected. The motion vector detector 131 also supplies information indicating the horizontal motion VX and the vertical motion VY of the detected motion vector V to the MC block difference detector 132, the cyclic-coefficient setting unit 133, and the motion compensator 134. The image I1 and the image P3 used for detecting the motion vector V are also supplied to the MC block difference detector 132 from the motion vector detector 131. Details of the motion vector detection processing are discussed below with reference to FIG. 18.

In step S22, the MC block difference detector 132 detects MC block differences. A technique for detecting MC block differences is discussed below with reference to FIGS. 9 and 10.

Figure 9:
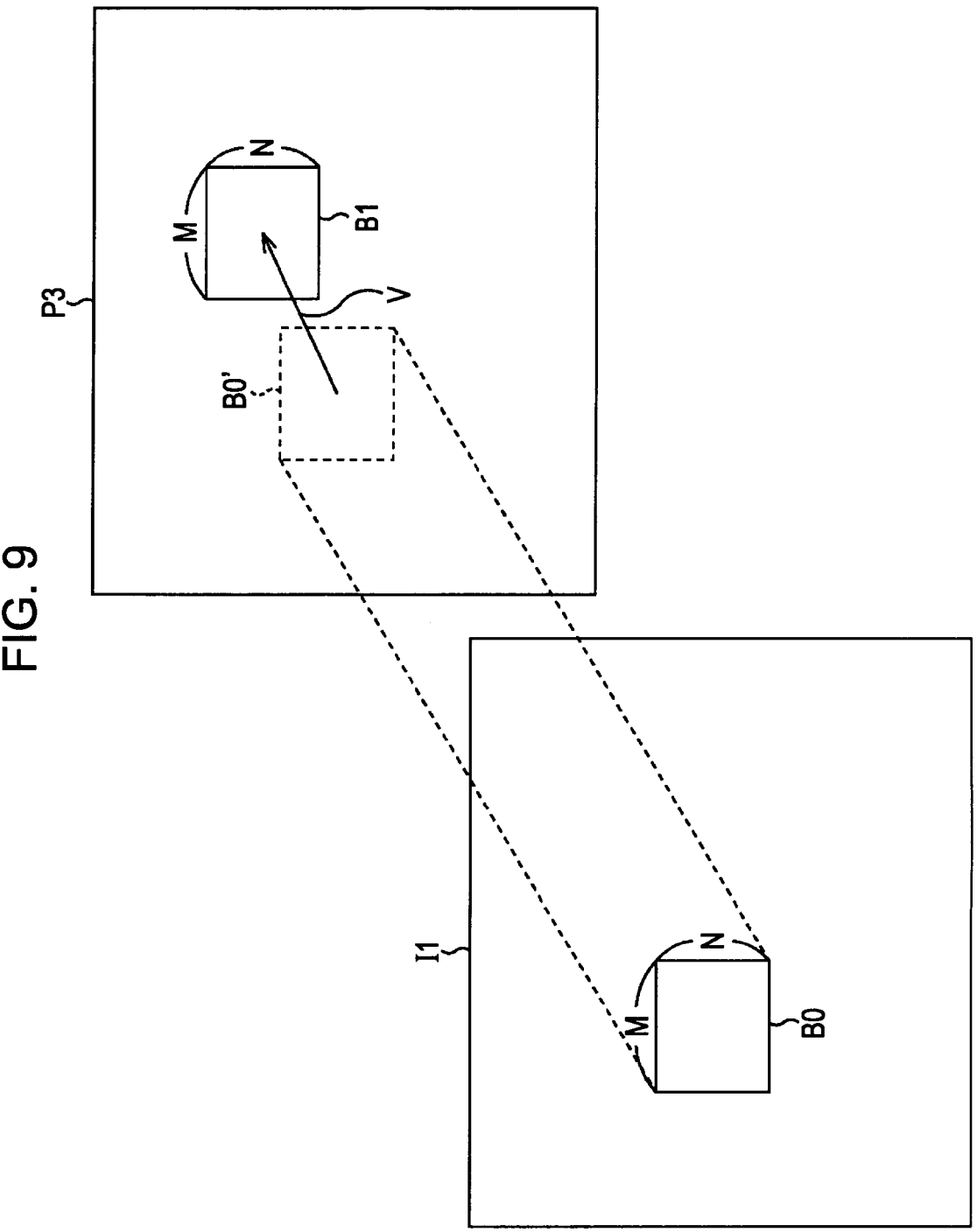
FIG. 9 illustrates an approach to detecting a motion compensation (MC) block difference BD.

The block of the image P3 located at a position corresponding to the position of the block B0 of the image I1 is set to be B0', as shown in FIG. 9. The block shifted from the block B0' by the direction and distance indicated by the motion vector V of the block B0 is set to be B1.

The horizontal motion VX and the vertical motion VY may contain decimal fractions since the motion vector V is a sub-pixel precision vector. In this case, the positions of the pixels forming the block B1 do not coincide with the actual positions of the pixels in the image P3. A technique for calculating the correct pixel values of the pixels forming the block B1 is discussed below with reference to FIG. 10.

Figure 10:
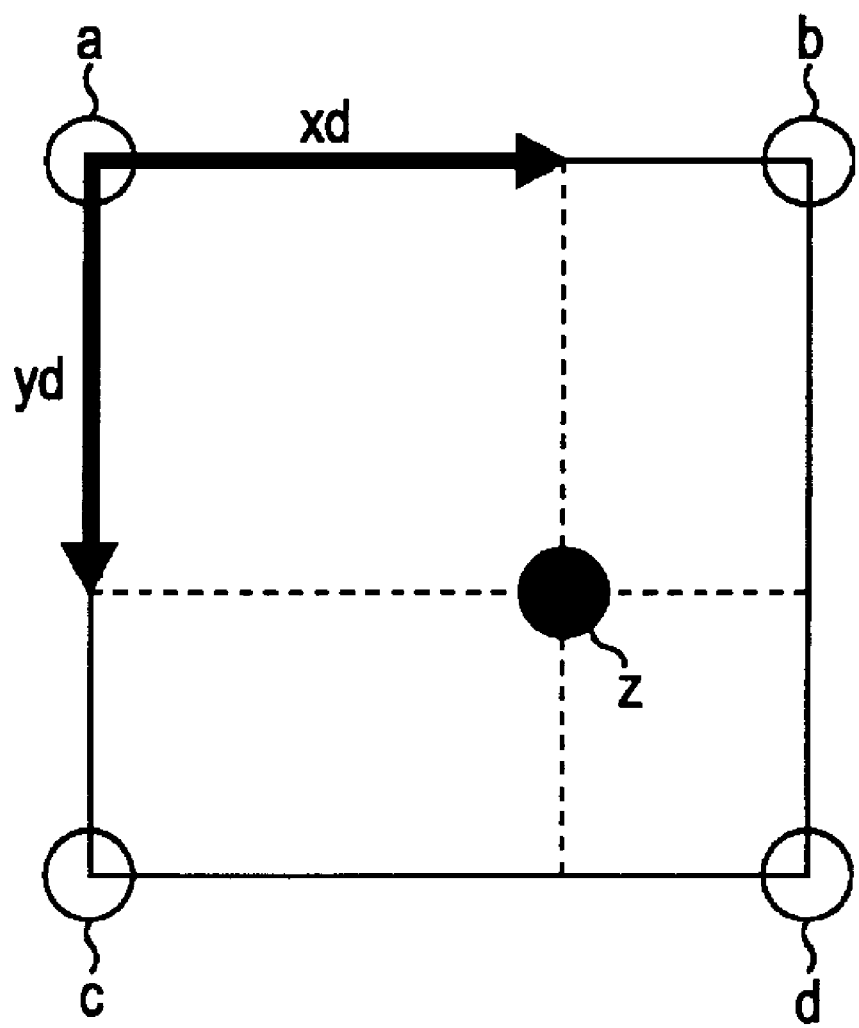
FIG. 10 illustrates an approach to detecting an MC block difference BD.

The pixel z indicated by the black circle in FIG. 10 is one pixel in the block B1 and does not exist in the image P3. The pixels a through d indicated by the white circles are pixels which exist in the image P3 and are located most adjacent to the pixel z. It is now assumed that the pixel values of the pixels a through d and the pixel z are represented by a through d and z, respectively, and that the distance in the x axis direction and the distance in the y axis direction between the pixel z and the pixel a positioned obliquely toward the top left are indicated by xd and yd, respectively. In this case, the pixel value z of the pixel z can be calculated according to the following equation (1).

$$z = (1-yd) \times ((1-xd) \times a + xd \times b) + yd \times ((1-xd) \times c + xd \times d) \quad (1)$$

If the positions of the pixels in the block B1 coincide with those of the actual pixels of the image P3, the pixel values of the image P3 can be directly used as those of the block B1.

After calculating the pixel value of each pixel in the block B1, the MC block difference detector 132 calculates the MC block difference BD according to the following equation (2):

$$BD = \sum_{i=0}^{M-1} \sum_{j=0}^{N-1} |B0(i, j) - B1(i, j)| \quad (2)$$

where $B0(i, j)$ designates the pixel value of the pixel in the block B0 located at the position (i, j) when the reference pixel, which is located at the top left corner of the block B0, is positioned at the origin (0, 0), and $B1(i, j)$ indicates the pixel value of the pixel in the block B1 located at the position (i, j) when the reference pixel, which is located at the top left corner of the block B1, is positioned at the origin (0, 0). That is, the MC block difference BD is the sum of the absolute values of the differences of the pixel values of the corresponding pixels between the block B0 and the block B1.

As the difference between the block image of the current frame and that of the previous frame is greater, the MC block difference BD becomes larger. Accordingly, it is highly likely that a block having a larger MC block difference BD is a block located in an image area with a complicated motion because of the deformation or complicated motion of a subject, the existence of edges in the subject, or the existence of a plurality of small subjects. It is thus highly likely that the motion vector V detected for that block is not correct, and the reliability of the motion vector V is low.

The MC block difference detector 132 detects the MC block difference BD for each block of the image I1, and supplies information indicating the detected MC block difference BD to the MC-block-difference subtraction amount calculator 182.

In step S23, the basic-cyclic-coefficient setting unit 171 sets basic cyclic coefficients. More specifically, the basic-cyclic-coefficient setting unit 171 sets the basic cyclic coefficient KA0 for an A type pixel of the image P1 on the basis of the vertical motion VY of the block which contains that A type pixel and the graph shown in FIG. 11. The basic-cyclic-coefficient setting unit 171 also sets the basic cyclic coefficient KB0 for a B type pixel of the image P1 on the basis of the vertical motion VY of the block which contains that B type pixel and the graph shown in FIG. 12.

Figure 11:
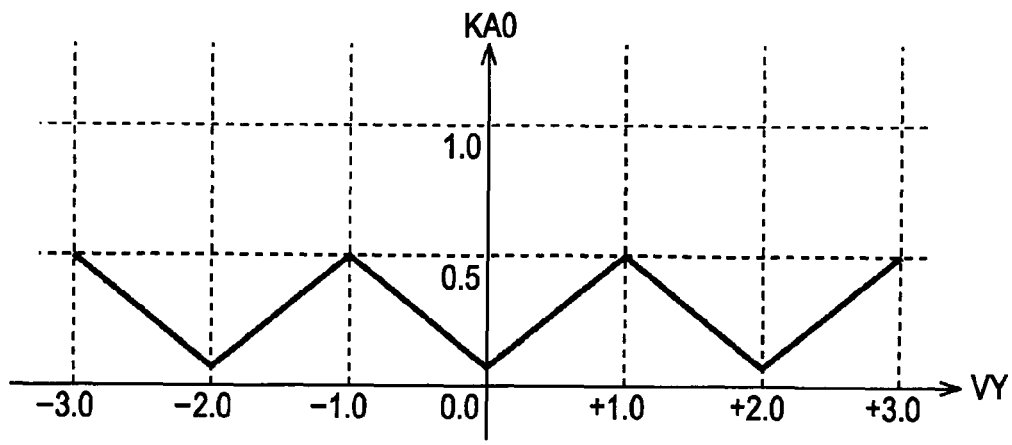
FIG. 11 is a graph illustrating the relationship between the vertical motion VY and the basic cyclic coefficient KA0.
Figure 12:
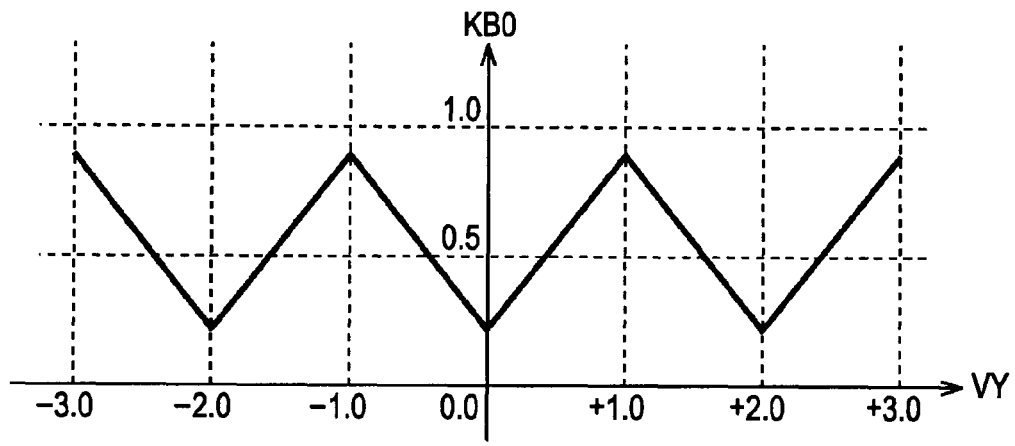
FIG. 12 is a graph illustrating the relationship between the vertical motion VY and the basic cyclic coefficient KB0.

The graph shown in FIG. 11 indicates the relationship between the vertical motion VY and the basic cyclic coefficient KA0, while the graph shown in FIG. 12 indicates the relationship between the vertical motion VY and the basic cyclic coefficient KB0.

Figure 13:
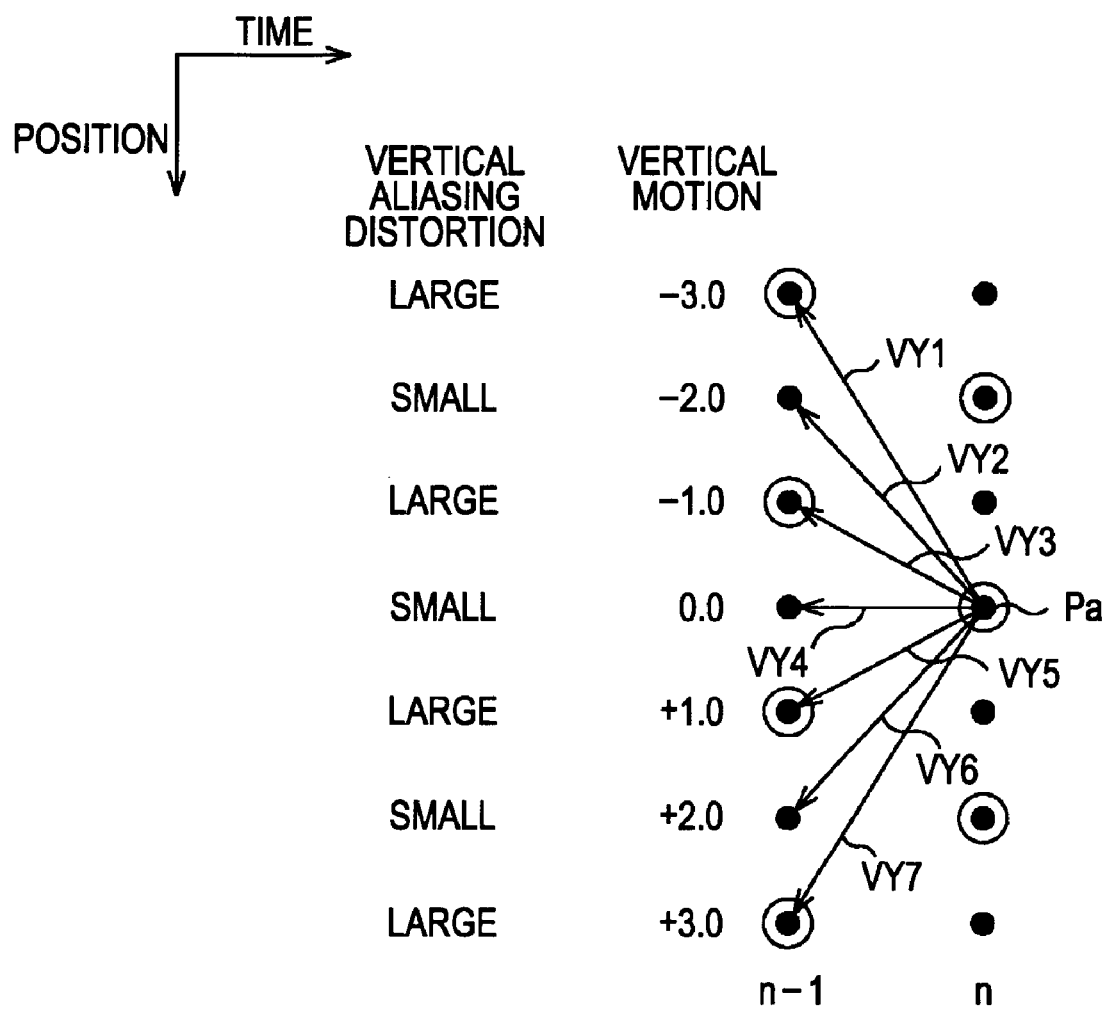
FIG. 13 illustrates the relationship between the vertical motion VY and the level of vertical aliasing distortion.

In images, the vertical aliasing distortion tends to be changed in accordance with the sub-pixel precision vertical motion. More specifically, the vertical aliasing distortion becomes greater as the absolute value of the vertical motion of each pixel is closer to an odd-number multiple of the pixel interval, and conversely, the vertical aliasing distortion becomes smaller when the absolute value of the vertical motion of each pixel is 0 or as it is closer to an even-number multiple of the pixel interval. As shown in FIG. 13, for example, as the vertical motion VY of the pixel Pa of the n-th frame is closer to an odd-number multiple of the pixel interval, the vertical aliasing distortion becomes greater, such as VY1, VY3, VY5, and VY7. Conversely, when the vertical motion VY of the pixel Pa is 0.0 or as it is closer to an even-number multiple of the pixel interval, the vertical aliasing distortion becomes smaller, such as VY2, VY4, and VY6.

As described below, as the cyclic coefficient is larger, the effect of suppressing the vertical aliasing distortion becomes higher, but on the other hand, the occurrence of image blur becomes higher. As the cyclic coefficient is smaller, the effect of suppressing the vertical aliasing distortion becomes lower, but on the other hand, the occurrence of image blur becomes lower. Accordingly, as shown in FIGS. 11 and 12, as the absolute value of the vertical motion VY is 0 or closer to an even number, i.e., as it is closer to an even-number multiple of the vertical pixel interval, the basic cyclic coefficients KA0 and KB0 are set to be smaller in order to suppress image blur. Conversely, as the absolute value of the vertical motion VY is closer to an odd number, i.e., as it is closer to an odd-number multiple of the vertical pixel interval, the basic cyclic coefficients KA0 and KB0 are set to be larger in order to suppress the vertical aliasing distortion.

When the absolute value of the vertical motion VY is 0 or an even number, the vertical aliasing distortion does not occur. To eliminate elements other than the vertical aliasing distortion, such as random noise, however, the basic cyclic coefficients KA0 and KB0 may be set to be suitable values other than 0, as shown in FIGS. 11 and 12.

Since B type pixels are not contained in the original image I1 before conversion, the influence of slight image blur on the image quality can be ignored. To further suppress aliasing distortion and random noise, therefore, the basic cyclic coefficient KB0 is set to be greater than the basic cyclic coefficient KA0 for the same vertical motion VY.

In this manner, by setting the basic cyclic coefficients KA0 and KB0 in accordance with the pixel type and the vertical motion, vertical aliasing distortion and random noise can be suppressed while maintaining high resolution of image P1, i.e., without the occurrence of image blur.

The basic-cyclic-coefficient setting unit 171 supplies information indicating the basic cyclic coefficients KA0 and KB0 to the subtractors 183-1 and 183-3, respectively.

In step S24, the motion distribution detector 172 detects the motion distribution. The motion distribution is discussed below with reference to FIGS. 14 and 15.

Figure 14:
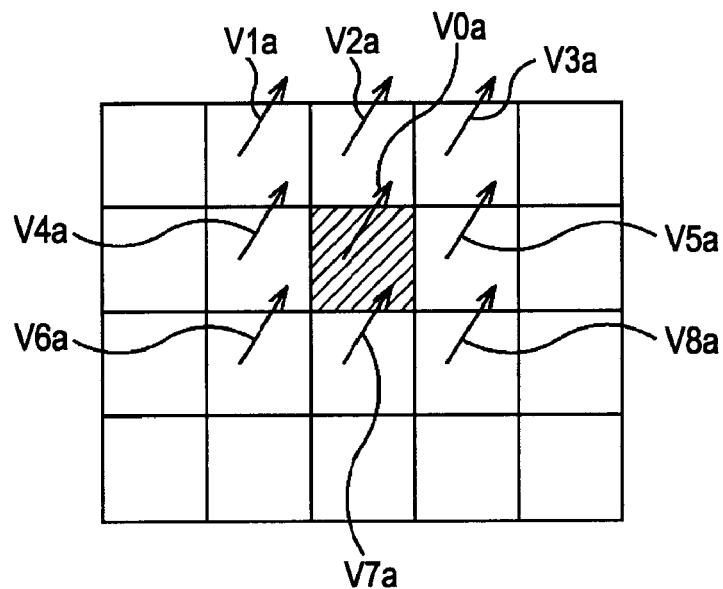
FIG. 14 illustrates an example of the distribution of motion vectors.
Figure 15:
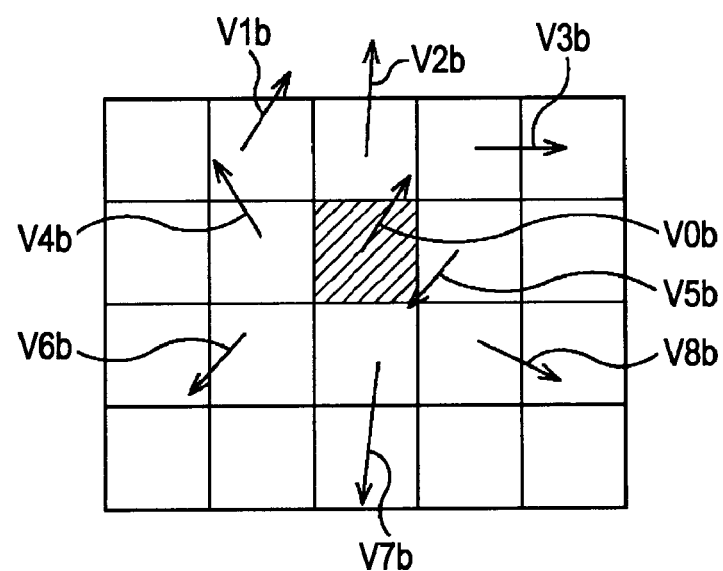
FIG. 15 illustrates another example of the distribution of motion vectors.

FIGS. 14 and 15 illustrate examples of motion distributions. When the motion vector V0a of the block indicated by the hatched portion is, as shown in FIG. 14, substantially similar to the motion vectors V1a through V8a of the surrounding blocks, i.e., when the similarity between the motion vector V0a and the motion vectors V1a through V8a of the surrounding blocks is high, it is likely that the motion vector V0a has been correctly determined. That is, the reliability of the motion vector V0a is high.

On the other hand, as shown in FIG. 15, when the magnitude and the orientation of the motion vector V0b of the block indicated by the hatched portion greatly differ from those of the motion vectors V1b through V8b of the surrounding blocks, i.e., when the similarity between the motion vector V0b and the motion vectors V1b through V8b of the surrounding blocks is low, it is likely that the motion vector V0b has not been correctly determined. That is, the reliability of the motion vector V0b is low.

Accordingly, as the reliability of the motion vector V detected by the motion vector detector 131, the motion distribution detector 172 detects the motion distribution MD0 representing the degree of distribution of the motion vector V in relation to the surrounding motion vectors V.

Figure 16:
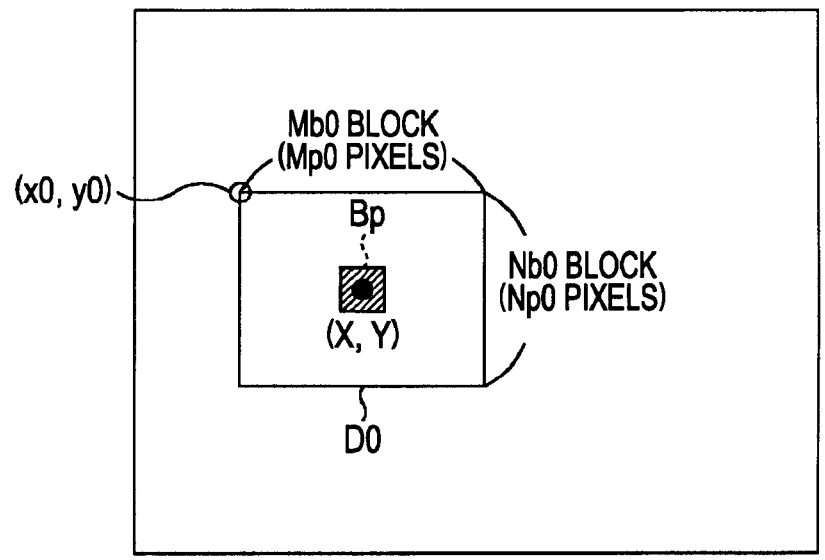
FIG. 16 illustrates a technique for calculating the motion distribution MD0.

More specifically, the motion distribution MD0(X, Y) of the motion vector V(X, Y) of the block Bp, indicated by the hatched portion in FIG. 16, which is located at the coordinates (X, Y) is calculated according to the following equation (3) for an Nb0-row×Mb0-column block (Np0-row×Mp0-column pixel) area D0:

$$MD0 = \frac{\sum_{y=y0}^{y0+Np0-1} \sum_{x=x0}^{x0+Np0-1} \left( \begin{array}{c} (vx0(x, y) - VX(X, Y))^2 + \\ (vy0(x, y) - VY(X, Y))^2 \end{array} \right)}{Mp0 \times Np0} \quad (3)$$

where vx0($x, y$) indicates the horizontal motion of the block that contains the pixel at the coordinates (x, y), and vy0($x, y$) represents the vertical motion of the block that contains the pixel at the coordinates (x, y). The coordinates of the pixel at the top left corner of the area D0 are (x0, y0).

That is, the motion distribution MD0 is represented by the average of the squares of the distances between the motion vector V of the block Bp and the motion vectors V of the individual pixels of the area D0.

The motion distribution detector 172 also detects, for each motion vector V as the reliability of the motion vector V, the motion distribution MD1 representing the distribution of the motion vector V in relation to the motion vectors V of the surrounding pixels (or blocks) of the previous frame that are shifted from the previous frame corresponding to the current frame by the direction and the distance indicated by the motion vector V.

Figure 17:
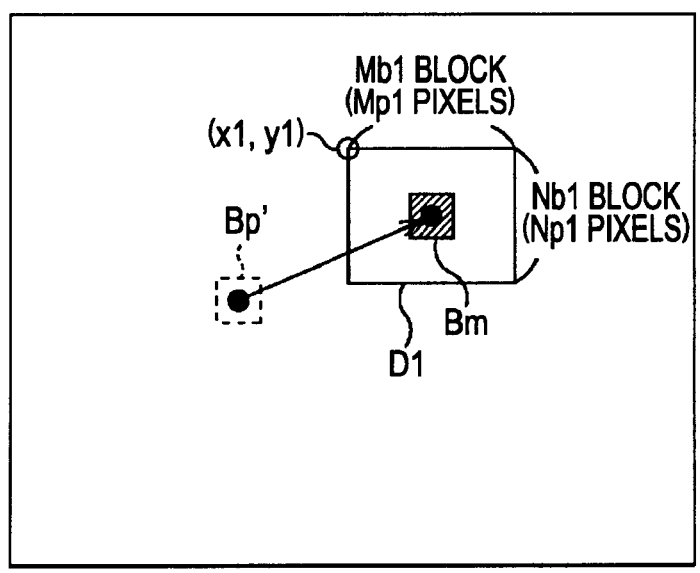
FIG. 17 illustrates a technique for calculating the motion distribution MD1.

More specifically, the block of the previous frame located at the corresponding position of the block Bp shown in FIG. 16 is set to be the block Bp' shown in FIG. 17. The block shifted from the block Bp' by the direction and the distance indicated by the value with the rounded decimal fractions of the horizontal motion VX(X, Y) and the vertical motion VY(X, Y) of the motion vector V(X, Y) of the block Bp is set to be Bm. The motion distribution detector 172 calculates the motion distribution MD1(X, Y) for the motion vector V(X, Y) of the block Bp for an Nb1-row×Mb1-column (Np1-row× Mp1-column pixel) block area D1 around the block Bm according to the following equation (4):

$$MD1 = \frac{\sum_{y=y1}^{y1+Np1-1} \sum_{x=x1}^{x1+Mp1-1} \left( \begin{array}{c} (vx1(x, y) - VX(X, Y))^2 + \\ (vy1(x, y) - VY(X, Y))^2 \end{array} \right)}{Mp1 \times Np1} \quad (4)$$

where vx1($x, y$) indicates the horizontal motion of the block that contains the pixel of the previous frame at the coordinates (x, y), and vy1($x, y$) represents the vertical motion of the block of the previous frame that contains the pixel at the coordinates (x, y). The coordinates of the pixel at the top left corner of the area D1 are (x1, y1).

That is, the motion distribution MD1 is represented by the average of the squares of the distances between the motion vector V of the block Bp and the motion vectors V of the individual pixels of the area D1.

The motion distribution detector 172 further calculates the motion distribution MD(X, Y) according to the following equation (5).

$$MD(X,Y)=MD1(X,Y)+MD2(X,Y) \quad (5)$$

Accordingly, as the distribution of the subject motion vector V in relation to the surrounding motion vectors V is larger, the motion distribution MD(X, Y) becomes larger. That is, it is highly likely that the pixel and the adjacent pixels corresponding to the motion vector V(X, Y) are contained in an image area with a complicated motion because of the deformation or complicated motion of a subject or the existence of a plurality of small subjects. It is thus highly likely that the motion vector V has not been correctly determined and the reliability of the motion vector V is low.

The motion distribution detector 172 calculates the motion distribution MD for each motion vector V according to the above-described technique, and supplies information indicating the detected motion distribution MD to the motion-distribution subtraction amount calculator 181.

In step S25, the motion-distribution subtraction amount calculator 181 calculates the motion-distribution subtraction amount. More specifically, the motion-distribution subtraction amount calculator 181 calculates the motion-distribution subtraction amount KM1 for each pixel of the image P1 by using the motion distribution MD of the block containing that pixel according to the following equation (6):

$$KM1(x,y)=a1 \times MD(X,Y)+b1 \quad (6)$$

where a1 and b1 are predetermined constants (a1 is a positive constant). If the value of the right side in equation (6) is smaller than 0, KM1($x, y$) is adjusted to be 0.

The motion-distribution subtraction amount calculator 181 supplies information indicating the calculated motion-distribution subtraction amounts KM1 to the subtractors 183-1 and 183-3.

In step S26, the MC-block-difference subtraction amount calculator 182 determines the MC-block-difference subtraction amount. More specifically, the MC-block-difference subtraction amount calculator 182 calculates the MC-block-difference subtraction amount KM2 for each pixel of the image P1 by using the MC block difference BD of the block containing that pixel according to the following equation (7):

$$KM2(x,y)=a2 \times BD(X,Y)+b2 \quad (7)$$

where a2 and b2 are predetermined constants (a2 is a positive constant). If the value of the right side in equation (7) is smaller than 0, KM2($x, y$) is adjusted to be 0.

In step S27, the subtractors 183-1 through 183-4 calculate cyclic coefficients. More specifically, the subtractor 183-1 subtracts the motion-distribution subtraction amount KM1 from the basic cyclic coefficient KA0 and supplies the resulting value to the subtractor 183-2. The subtractor 183-2 subtracts the MC-block-difference subtraction amount KM2 from the value supplied from the subtractor 183-1 and supplies the resulting value to the product sum computation unit 135 as the cyclic coefficient KA. That is, the cyclic coefficient KA(x, y) for an A type pixel located at the coordinates (x, y) of the image P1 is calculated according to the following equation (8).

$$KA(x,y)=KA0(x,y)-KM1(x,y)-KM2(x,y) \quad (8)$$

The subtractor 183-3 subtracts the motion-distribution subtraction amount KM1 from the basic cyclic coefficient KB0 and supplies the resulting value to the subtractor 183-4. The subtractor 183-4 subtracts the MC-block-difference subtraction amount KM2 from the value supplied from the subtractor 183-3 and supplies the resulting value to the product sum computation unit 135 as the cyclic coefficient KB. That is, the cyclic coefficient KB(x, y) for a B type pixel located at the coordinates (x, y) of the image P1 is calculated according to the following equation (9).

$$KB(x,y)=KB0(x,y)-KM1(x,y)-KM2(x,y) \quad (9)$$

That is, the cyclic coefficients KA(x, y) and KB(x, y) are corrected to be smaller as the motion-distribution subtraction amount KM1($x, y$) or the MC-block-difference subtraction amount KM2(x, y), i.e., the motion distribution MD(x, y) or the MC block difference BD(x, y), becomes larger.

In step S28, the motion compensator 134 performs motion compensation on the output image of the previous frame. More specifically, the motion compensator 134 reads out the image P3 of the previous frame from the frame memory 136 and performs motion compensation on the image P3 by using the motion vector V to generate the motion-compensated image P4.

The pixel values of the pixels of the image P4 are equal to the pixel values of the pixels of the image P3 located at the corresponding positions shifted from the image P1 by the directions and the distances indicated by the motion vectors V. If pixels do not exist at the positions of the image P3 shifted from the image P1 since the horizontal motion VX or the vertical motion VY of the motion vector V contains decimal fractions, the pixel values of the image P4 are calculated by a technique similar to that discussed with reference to FIG. 10.

The motion compensator 134 sequentially supplies the pixel values P4(x, y) of the image P4 to the product sum computation unit 135.

In step S29, the product sum computation unit 135 synthesizes an image and completes the cyclic conversion processing. More specifically, the product sum computation unit 135 adds the pixel values of the pixels located at corresponding positions of the image P1 and the image P4 by using the cyclic coefficients KA0 and KB0 as weights. That is, the product sum computation unit 135 calculates, for A type pixels, the pixel values P2(x, y) of the image P2 by using the cyclic coefficients KA according to the following equation (10), and calculates, for B type pixels, the pixel values P2(x, y) of the image P2 by using the cyclic coefficients KB according to the following equation (11).

$$P2(x,y)=(1-KA(x,y))\times P1(x,y)+KA(x,y)\times P4(x,y) \qquad (10)$$

$$P2(x,y)=(1-KB(x,y))\times P1(x,y)+KB(x,y)\times P4(x,y) \qquad (11)$$

Generally, as the cyclic coefficients KA(x, y) and KB(x, y) become larger, the ratio of the components of the image P4 that make up the image P2 becomes greater. Accordingly, the effect of suppressing vertical aliasing distortion becomes greater, but on the other hand, the occurrence of image blur becomes higher. In contrast, as the cyclic coefficients KA(x, y) and KB(x, y) become smaller, the ratio of the components of the image P4 that make up the image P2 becomes smaller. Accordingly, the effect of suppressing vertical aliasing distortion becomes smaller, but on the other hand, the occurrence of image blur becomes lower.

In this embodiment, as stated above, the cyclic coefficients KA(x, y) and KB(x, y) become smaller as the motion-distribution subtraction amount KM1(x, y) or the MC-block-difference subtraction amount KM2(x, y), i.e., the motion distribution MD(x, y) or the MC block difference BD(x, y), is greater.

More specifically, if the reliability of the motion vector V(X,Y) of the pixel positioned at the coordinates (x, y) is low, i.e., if the correlation between the pixel of the image P1 and the pixel of the image P4, which are to be added by using weights, is low, or if the possibility of the pixel being contained in an area having a complicated image motion with unnoticeable aliasing distortion or random noise is high, the ratio of the components of the pixel values P1(x, y) that make up the pixel values P2(x, y) is large. Conversely, if the reliability of the motion vector V(X,Y) of the pixel positioned at the coordinates (x, y) is high, i.e., if the correlation between the pixel of the image P1 and the pixel of the image P4, which are to be added by using weights, is high, or if the possibility of the pixel being contained in an area having a small motion over a wide range with noticeable aliasing distortion or random noise is high, the ratio of the components of the pixel values P1(x, y) that make up the pixel values P2(x, y) is small.

As the absolute value of the vertical motion VY(X, Y) is closer to an odd number, i.e., as vertical aliasing distortion is greater, the cyclic coefficients KA(x, y) and KB(x, y) become larger, and the components of the pixel values P4(x, y) that make up the pixel values P2(x, y) become greater. Conversely, as the absolute value of the vertical motion VY(X, Y) is 0 or closer to an even number, i.e., as vertical aliasing distortion is smaller, the cyclic coefficients KA(x, y) and KB(x, y) become smaller, and the components of the pixel values P1(x, y) that make up the pixel values P2(x, y) become greater.

Additionally, for the same vertical motion VY, the basic cyclic coefficient KB0 for a B type pixel is set to be larger than the basic cyclic coefficient KA0 for an A type pixel, and the motion-distribution subtraction amount KM1 and the MC-block subtraction amount KM2 do not change depending on the type of pixel. Accordingly, in the same image area, the cyclic coefficient KB(x, y) becomes greater than the cyclic coefficient KA(x, y), and thus, the ratio of the components of the pixel values P4(x, y) that make up the image pixels P2(x, y) becomes greater for the B type pixels than for the A type pixels.

Thus, in the resulting image P2, the high-resolution image quality can be obtained while suppressing vertical aliasing distortion and random noise and inhibiting the occurrence of image blur.

The product sum computation unit 135 supplies the generated image P2 to the output phase converter 112 and also stores the image P2 in the frame memory 136.

Details of the motion vector detection processing in step S21 in FIG. 8 are described below with reference to the flowchart in FIG. 18.

In step S41, the motion-estimated-value detector 151 obtains the image of the previous frame. More specifically, the motion-estimated-value detector 151 reads out the image P3, which is the output image of the previous frame, from the frame memory 136.

In step S42, the motion-estimated-value detector 151 calculates the motion estimated values at the pixel positions. More specifically, the motion-estimated-value detector 151 selects one block of the image I1 for which a motion vector has not been detected and sets the block as the subject block. The motion-estimated-value detector 151 sequentially selects the pixels in a predetermined area of the image P3 as subject pixels and determines the motion estimated value M(x, y) of each subject pixel according to the following equation (12):

$$M(x, y) = \sum_{i=0}^{M-1} \sum_{j=0}^{\frac{N-1}{2}} |I1(xb + i, yb + 2j) - P3(x + i, y + 2j)| \qquad (12)$$

where (x, y) designates the coordinates of the subject pixel and (xb, yb) indicates the coordinates of the reference pixel at the top left corner of the subject block.

That is, the motion estimated value M is the sum of the absolute values of the differences of the pixel values at corresponding positions between a comparative block using the subject pixel as the reference pixel and the subject block. As the motion estimated value M is smaller, the image in the comparative block is closer to the image in the subject block.

The motion-estimated-value detector 151 supplies information indicating the detected motion estimated value M of each pixel to the pixel-precision motion vector detector 152 and the tap extracting units 153 and 154.

In step S43, the pixel-precision motion vector detector 152 detects a pixel-precision motion vector. More specifically, the pixel-precision motion vector detector 152 detects the pixel having the smallest motion estimated value M, i.e., the minimum estimated value pixel. The pixel-precision motion vector detector 152 detects the vector that connects the coordinates of the minimum estimated value pixel with the coordinates of the reference pixel of the subject block as the pixel-precision motion vector of the subject block. The pixel-precision motion vector detector 152 supplies information indicating the detected pixel-precision motion vector to the tap extracting units 153 and 154.

In step S44, the tap extracting unit 153 extracts prediction taps. More specifically, the tap extracting unit 153 extracts, as prediction taps, the motion estimated values M corresponding to the minimum estimated value pixel and the pixels of the image P3 near the minimum estimated value pixel.

Figure 19:
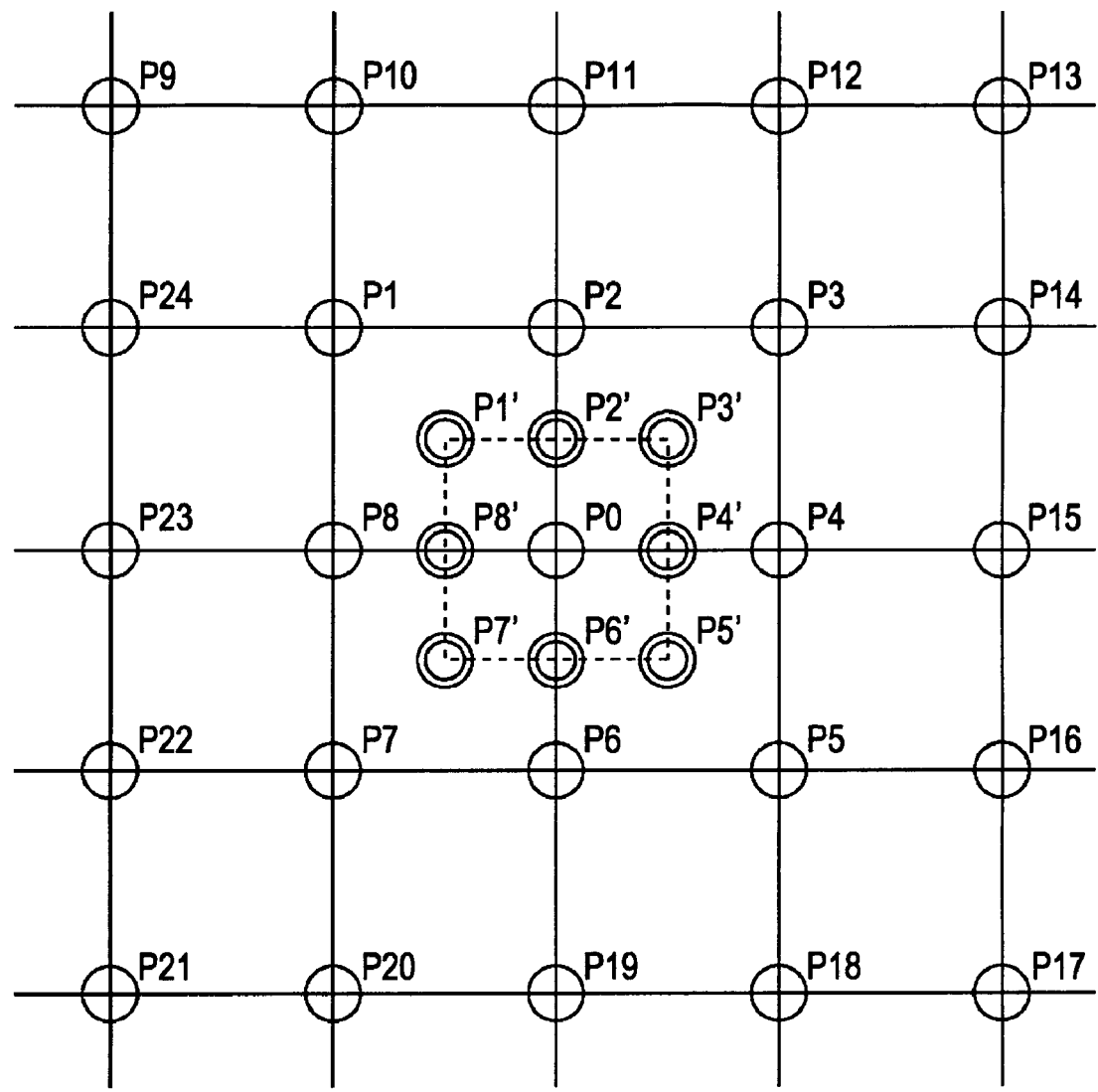
FIG. 19 is a technique for detecting sub-pixel-precision motion vectors.

FIG. 19 illustrates part of the image P3. In FIG. 19, the minimum estimated value pixel is set to be pixel p0, and the motion estimated values associated with the pixels p0 through p24 are set to be motion estimated values M0 through M24, respectively. The tap extracting unit 153 extracts, as prediction taps, for example, the motion estimated values M0 through M24 associated with the pixel P0, which is the minimum estimated value pixel, the pixels P1 through P8 around the pixel P0, and the pixels P9 through P24 around the pixels P1 through P8. The tap extracting unit 153 supplies the extracted prediction taps to the prediction computation unit 158.

In step S45, the tap extracting unit 154 extracts class taps. More specifically, in the example shown in FIG. 19, the tap extracting unit 154 extracts, as class taps, for example, the motion estimated values M0 through M8 associated with the pixel 0, which is the minimum estimated value pixel, and the pixels P1 through P8 adjacent to the pixel P0. The tap extracting unit 154 supplies the extracted class taps to the ADRC processor 155.

In step S46, the ADRC processor 155 performs ADRC processing. More specifically, the ADRC processor 155 performs ADRC processing on the motion estimated values M of the pixels forming the class taps and supplies information indicating the resulting ADRC code to the classification unit 156.

In step S47, the classification unit 156 performs classification processing. More specifically, the classification unit 156 classifies the minimum estimated value pixel based on the ADRC code supplied from the ADRC processor 155, and supplies information indicating the class code associated with the resulting class to the coefficient memory 157.

In step S48, the coefficient memory 157 supplies the tap coefficient. More specifically, the coefficient memory 157 obtains the tap coefficient associated with the class code of the minimum estimated value pixel from a set of tap coefficients stored in the coefficient memory 157. The coefficient memory 157 supplies the obtained tap coefficient to the prediction computation unit 158.

In step S49, the prediction computation unit 158 performs prediction computation processing. More specifically, in the example shown in FIG. 19, the positions P1' through P8' in the middle of the straight lines connecting the pixel P0 with the pixels P1 through P8 are set to be prediction positions. In this case, the prediction computation unit 158 calculates the motion estimated values M1' through M8' at the positions P1' through P8', respectively, according to the following equation (13):

$$Mm' = \sum_{n=0}^{24} w_{mn} \times M_n = w_{m0} \times M_0 + \ldots + w_{m24} \times M_{24} \quad (13)$$

where m is 1 to 8, and $w_{mn}$ (n=0 through 24) represents tap coefficients used for calculating the motion estimated values Mm' (m=1 through 8) at the positions Pm' (m=1 through 8), respectively.

The prediction computation unit 158 supplies the motion estimated value Mm' at each prediction position to the sub-pixel-precision motion vector detector 159.

In step S50, the sub-pixel-precision motion vector detector 159 detects a sub-pixel-precision motion vector. More specifically, in the example shown in FIG. 19, the sub-pixel-precision motion vector detector 159 detects the minimum motion estimated value from among the motion estimated values of the pixel P0 and the positions P1' through P8'. The sub-pixel-precision motion vector detector 159 detects, as the sub-pixel-precision motion vector V, the vector that connects the coordinates of the minimum motion-estimated-value pixel or position with the coordinates of the reference pixel of the subject block. That is, in this example, the motion vector is detected with a precision of ½ the pixel interval.

By increasing the number of prediction positions between pixels, motion vectors can be detected with higher precision, i.e., in smaller units.

The sub-pixel-precision motion vector detector 159 supplies information indicating the detected motion vector V to the MC block difference detector 132, the cyclic-coefficient setting unit 133, and the motion compensator 134.

In step S51, the motion-estimated-value detector 151 determines whether motion vectors have been detected for all the blocks. If there is any block for which a motion vector has not been detected, the process returns to step S42. Steps S42 through S51 are repeated until it is determined in step S51 that motion vectors have been detected for all the blocks.

If it is determined in step S51 that motion vectors have been detected for all the blocks, the process proceeds to step S52.

In step S52, the motion-estimated-value detector 151 supplies the images used for detecting the motion vectors, and then completes the sub-pixel-precision motion vector detection processing. More specifically, the motion-estimated-value detector 151 supplies the images I1 and P3 used for detecting the motion vectors to the MC block difference detector 132.

Learning for tap coefficients to be stored in the coefficient memory 157 is as follows.

Learning for tap coefficients in classification adaptation processing is first discussed on the basis of a generalized example. More specifically, learning for tap coefficients based on a linear coupling model is discussed below. In the linear coupling model, the pixel value y of a pixel forming an HD image (hereinafter sometimes referred to as an "HD pixel") is determined from pixels forming an SD image (hereinafter sometimes referred to as "SD pixels") by using a tap coefficient and a plurality of SD pixels, which are extracted as prediction taps used for predicting the HD pixel, according to linear coupling expressed by the following linear expression (14):

$$y = \sum_{n=1}^{N} w_n x_n \quad (14)$$

where $x_n$ represents the pixel value of the n-th pixel of the SD image forming the prediction taps for the HD pixel y, and $w_n$ designates the n-th tap coefficient to be multiplied by the n-th pixel value of the SD image. It should be noted that the prediction taps are formed of N SD image pixels $x_1, x_2, \ldots,$ and $x_N$ in equation (14).

If the true value of the pixel value of the k-sample HD pixel is represented by $y_k$ and the prediction value of the true value $y_k$ obtained by equation (14) is represented by $y_k'$, the prediction error $e_k$ can be expressed by the following equation (15).

$$e_k = y_k - y_k' \quad (15)$$

The prediction value $y_k'$ in equation (15) can be obtained by equation (14). Accordingly, if equation (14) is substituted into equation (15), the following equation can be found:

$$e_k = y_k - \left( \sum_{n=1}^{N} w_n x_{n,k} \right) \quad (16)$$

where $x_{n,k}$ designates the n-th SD pixel forming the prediction taps for the k-sample HD pixel.

The tap coefficient $w_n$ that reduces the prediction error $e_k$ in equation (16) to 0 is the optimal tap coefficient $w_n$ for predicting the HD pixel. Generally, however, it is difficult to obtain such a tap coefficient $w_n$ for all HD pixels.

If, for example, the method of least squares, is employed as the standard for representing that the tap coefficient $w_n$ is optimal, the optimal tap coefficient $w_n$ can be obtained by minimizing the statistical error, such as the total error E of square errors expressed by the following equation (17):

$$E = \sum_{k=1}^{K} e_k^2 \quad (17)$$

where K is the number of samples of sets of the HD pixels $y_k$ and the SD pixels $x_{1,k}, x_{2,k}, \ldots, x_{N,k}$ forming the prediction taps for the HD pixels $y_k$.

The minimum value of the total error E of the square errors in equation (17) can be given by the tap coefficient $w_n$ that allows the value obtained by partially differentiating the total error E with respect to the tap coefficient $w_n$ to be 0, as expressed by equation (18).

$$\frac{\partial E}{\partial w_n} = e_1 \frac{\partial e_1}{\partial w_n} + e_2 \frac{\partial e_2}{\partial w_n} + \ldots + e_k \frac{\partial e_{k2}}{\partial w_n} = 0 \quad (18)$$

$$(n = 1, 2, \ldots, N)$$

Then, if equation (18) is partially differentiated with respect to the tap coefficient $w_n$, the following equation can be found.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (19)$$

$$(k = 1, 2, \ldots, K)$$

The following equation can be found from equations (18) and (19).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (20)$$

By substituting equation (16) into $e_k$ in equation (20), equation (20) can be represented by normal equations, as expressed by equation (21).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (21)$$

By preparing a certain number of sets of HD pixels $y_k$ and SD pixels $x_{n,k}$, the same number of normal equations expressed by equation (21) as the number of the tap coefficients $w_n$ to be determined can be established. Accordingly, by solving the normal equations expressed by equation (21), the optimal tap coefficient $w_n$ can be determined. To solve the normal equations expressed by equation (21), for example, a sweeping-out method (Gauss-Jordan elimination method), may be employed. To solve the normal equation expressed by equation (21), the matrix in the left side corresponding to the tap coefficient $w_n$ should be regular.

As discussed above, the optimal tap coefficient $w_n$ can be determined by solving the normal equations expressed by equation (21) by using many HD pixels $y_1, y_2, \ldots, y_k$ as supervisor data for learning tap coefficients and SD pixels $x_{1,k}, x_{2,k}, \ldots, x_{N,k}$ forming the prediction taps for each HD pixel $y_k$ as learner data for learning tap coefficients.

In this case, as supervisor data y, an image including pixels at prediction positions, i.e., having a pixel density higher than the image P3, and more specifically, a high-density image having motion estimated values M (hereinafter referred to as a "supervisor image") detected for the individual pixels, is used. As learner data x, an image generated by reducing the number of pixels from the supervisor image so that the pixel density of the resulting image becomes equal to that of the image P3 is used. Then, the tap coefficient used in equation (13) can be determined.

Details of a technique for detecting sub-pixel-precision motion vectors using classification adaptation processing are disclosed in, for example, Japanese Unexamined Patent Application Publication No. 9-187013 previously filed by the assignee of this application.

As described above, an interlace image can be converted into a higher-quality progressive image.

Since an image without vertical aliasing distortion or noise is output from the cyclic IP converter 111, a higher quality image can be obtained in a subsequent image processing apparatus. For example, in processing for adjusting the image quality in terms of a plurality of elements by using classification adaptation processing, such as that disclosed in Japanese Unexamined Patent Application Publication No. 2002-218413 previously filed by the assignee of this application, it is possible to adjust the image quality so that the resolution can be increased, resulting in a higher quality image.

In the above-described example, the image associated with the image I1 for which a motion vector V is detected is the image P3, which is the output image of the previous frame (one frame before). Alternatively, instead of the image P3, an image I2, which is the input image of the previous field (one field before), or an image I3, which is the input image of two fields before, may be used.

Figure 20:
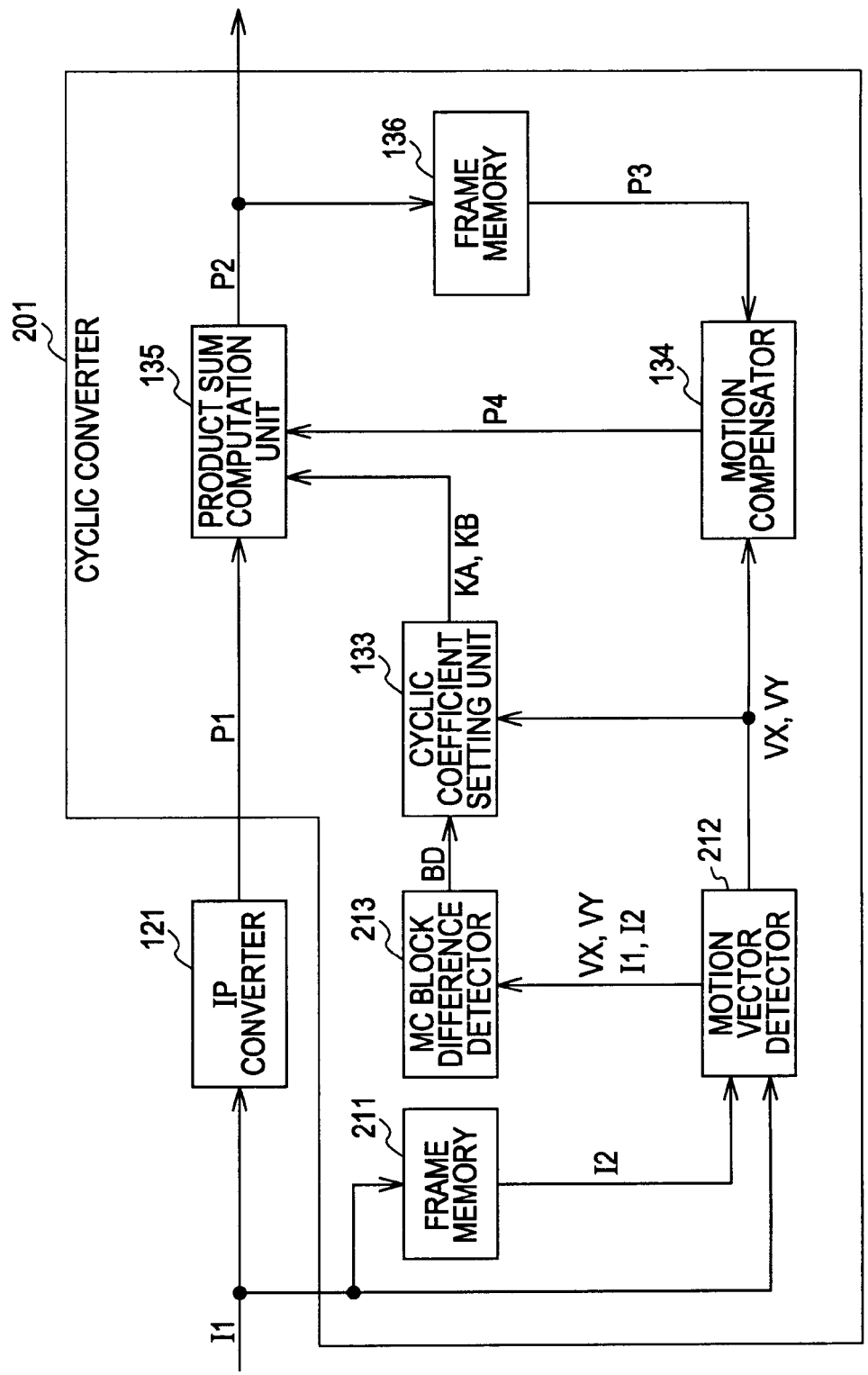
FIG. 20 is a block diagram illustrating an example of a cyclic converter according to an embodiment of the present invention.

FIG. 20 is a block diagram illustrating the functional configuration of a cyclic converter 201 when an image I2, which is the input image one field before, is used as the image associated with the image I1 for which a motion vector V is detected. The cyclic converter 201 includes a frame memory 211, a motion vector detector 212, an MC block difference detector 213, the cyclic-coefficient setting unit 133, the motion compensator 134, the product sum computation unit 135, and the frame memory 136. Elements corresponding to those in FIG. 2 are designated with like reference numerals, and an explanation thereof is thus omitted.

The frame memory 211 stores the externally input image I1 therein and delays the image I1 for one field, and then supplies the delayed image I1 to the motion vector detector 212. That is, the image I2, which is delayed for one field from the image I1 after being input into the cyclic converter 201, is supplied to the motion vector detector 212.

The motion vector detector 212 detects a motion vector V for the image I2 in a manner similar to that by the motion vector detector 131. The motion vector detector 212 supplies information indicating the detected motion vector V (including the horizontal motion VX and the vertical motion VY) to the MC block difference detector 213, the cyclic-coefficient setting unit 133, and the motion compensator 134. The motion vector detector 212 also supplies the image I1 and the image I2 used for detecting the motion vector to the MC block difference detector 213.

The MC block difference detector 213 detects MC block differences, which are the differences between the pixel values of the pixels of each block of the image I1 and the pixel values of the pixels of the corresponding block of the image I2, which is shifted from the block of the image I1 by the direction and distance indicated by the motion vector V. The MC block difference detector 213 supplies information indicating the detected MC block differences to the cyclic-coefficient setting unit 133.

Figure 21:
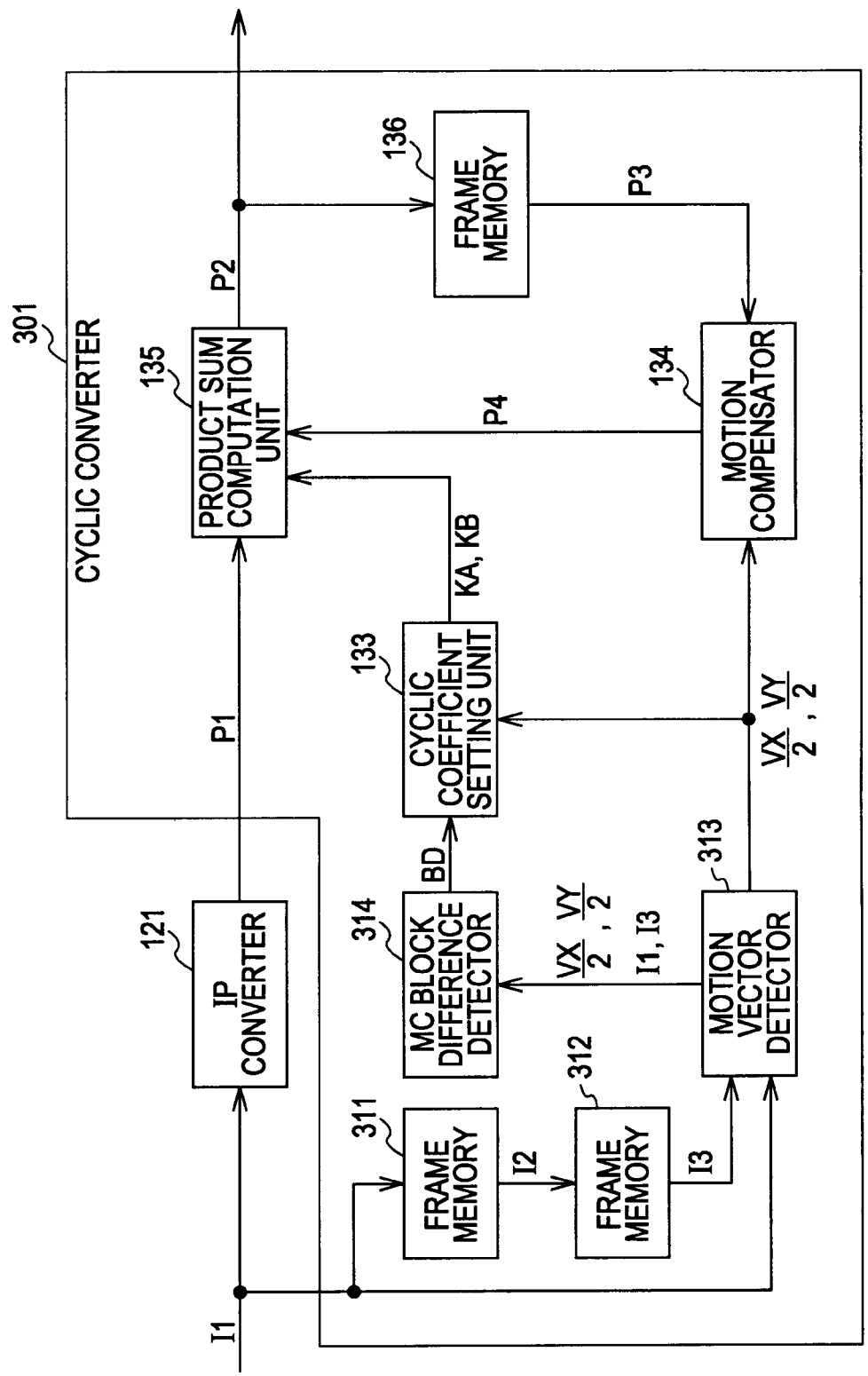
FIG. 21 is a block diagram illustrating another example of a cyclic converter according to an embodiment of the present invention.

FIG. 21 is a block diagram illustrating the functional configuration of a cyclic converter 301 when an image I3, which is the input image two fields before, is used as the image associated with the image I1 for which a motion vector V is detected. The cyclic converter 301 includes a frame memory 311, a frame memory 312, a motion vector detector 313, an MC block difference detector 314, the cyclic-coefficient setting unit 133, the motion compensator 134, the product sum computation unit 135, and the frame memory 136. Elements corresponding to those in FIG. 2 are designated with like reference numerals, and an explanation thereof is thus omitted.

The frame memory 311 stores the externally input image I1 therein and delays the image I1 for one field, and then supplies the delayed image I1 to the frame memory 312. That is, the image I2, which is delayed for one field from the image I1 after being input into the cyclic converter 301, is supplied to the frame memory 312.

The frame memory 312 stores the image I2 therein and delays the image I2 for one field, and then supplies the image I2 to the motion vector detector 313. That is, the image I3, which is the delayed image I2 for two fields from the image I1 after being input into the cyclic converter 301, is supplied to the motion vector detector 313.

The motion vector detector 313 detects the motion vector V for the image I3 associated with the image I1 in a manner similar to that by the motion vector detector 131. The detected motion vector V is a motion vector having an interval twice as long as the field interval for which the image I1 is input or the frame interval for which the image P2 is output, i.e., having an interval of two fields. To provide matching, therefore, the motion vector detector 313 supplies information indicating a vector one half the detected motion vector, i.e., one half the horizontal motion VX and the vertical motion VY, to the MC block difference detector 314, the cyclic-coefficient setting unit 133, and the motion compensator 134. The motion vector detector 313 also supplies the image I1 and the image I3 used for detecting the motion vector V to the MC block difference detector 314.

The MC block difference detector 314 detects the MC block difference between the pixel values of each block of the image I1 and the pixel values of the corresponding block of the image I3, which is shifted from the image I1 by the direction and distance indicated by the vector one half the motion vector V. The MC block difference detector 314 supplies information indicating the MC block difference BD to the cyclic-coefficient setting unit 133.

For the sub-pixel-precision motion vector detection processing, a method other than the above-described method may be employed.

In the above-described example, an SD image is subjected to IP conversion. Alternatively, a higher resolution image, such as an HD image, may be subjected to IP conversion.

The present invention is applicable to an image processing apparatus for converting an interlace image into a progressive image, such as a television receiver.

The above-described series of processing operations may be executed by hardware or software. If software is used, a program recording that software thereon is installed from a program recording medium into a computer built in dedicated hardware or a general-purpose computer that can execute various functions by installing various programs therein.

Figure 22:
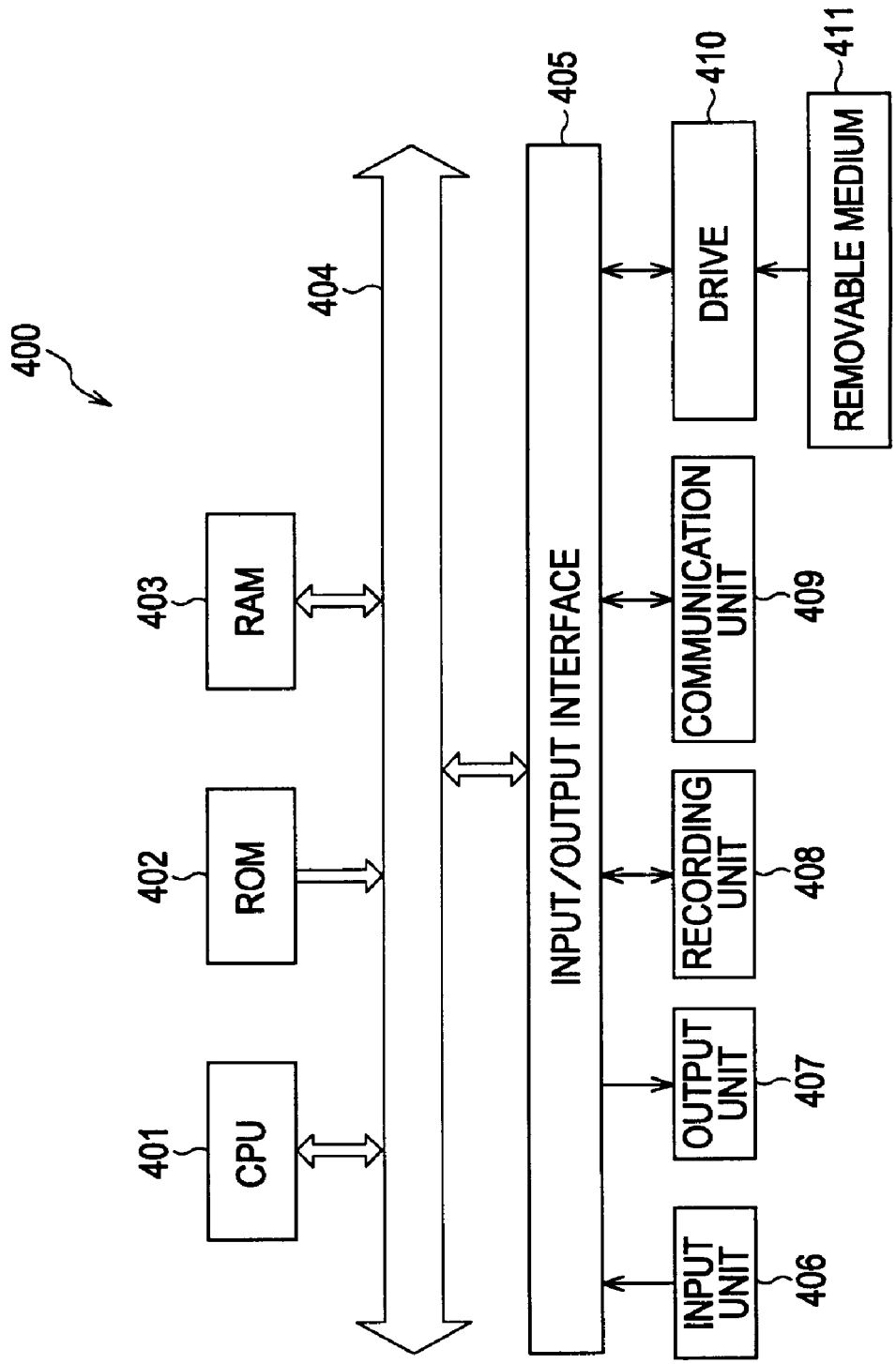
FIG. 22 is a block diagram illustrating an example of the configuration of a personal computer.

FIG. 22 is a block diagram illustrating an example of the configuration of a personal computer 400 that executes the above-described series of processing operations. A central processing unit (CPU) 401 executes various processing operations according to a program stored in a read only memory (ROM) 402 or a recording unit 408. In a random access memory (RAM) 403, programs and data executed by the CPU 401 are stored if necessary. The CPU 401, the ROM 402, and the RAM 403 are connected to each other via a bus 404.

An input/output interface 405 is connected to the CPU 401 with the bus 404 therebetween. An input unit 406 including a keyboard, a mouse, and a microphone and an output unit 407 including a display and a speaker are connected to the input/ output interface 405. The CPU 401 executes various processing operations in response to an instruction input from the input unit 406. The CPU 401 outputs processing results to the output unit 407.

The recording unit 408 connected to the input/output interface 405 includes, for example, a hard disk, and stores programs and various data executed by the CPU 401. A communication unit 409 communicates with an external device via a network, such as the Internet or a local area network (LAN).

The program may be obtained via the communication unit 409 and stored in the recording unit 408.

A removable medium 411, such as a magnetic disk, an optical disc, a magneto-optical disk, or a semiconductor memory, is installed in a drive 410 connected to the input/output interface 405, and the drive 410 drives the installed removable medium 411 and obtains a program or data recorded on the removable medium 411. The obtained program or data is transferred to the recording unit 408 and stored therein if necessary.

The program recording medium storing a program which is installed in the computer and becomes executable by the computer may be, as shown in FIG. 22, the removable medium 411, which is a package medium, such as a magnetic disk (including a flexible disk), an optical disc (including a compact disc read only memory (CD-ROM) and a digital versatile disc (DVD)), a magneto-optical disk, or a semiconductor memory. Alternatively, the program recording medium may be the ROM 402 or a hard disk forming the recording unit 408 in which the program is temporarily or permanently stored. The program may be stored in the program recording medium by using a wired or wireless communication medium, such as a LAN, the Internet, or digital satellite broadcasting, via the communication unit 409, which is an interface, such as a router or a modem, if necessary.

In this specification, steps forming the program to be stored in a program recording medium may be executed in chronological order indicated in the specification. Alternatively, they may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for converting an interlace input image into a progressive output image, comprising:
   interlace-progressive conversion means for converting the interlace input image into a progressive intermediate image;
   motion-vector detection means for detecting motion vectors of the interlace input image by using, as a minimum unit, a distance shorter than an interval between pixels forming the progressive intermediate image;
   cyclic-coefficient setting means for setting, on the basis of a vertical motion, which is a vertical component of each of the motion vectors, a first cyclic coefficient for a first type of pixel that is located at a position where a pixel forming the interlace input image exists, and a second cyclic coefficient for a second type of pixel, which is located at a position where a pixel forming the interlace input image does not exist;
   motion compensation means for motion-compensating, on the basis of the motion vectors, a past progressive output image to generate a motion-compensated image; and
   output image generating means for generating the progressive output image by adding pixel values of the first type of pixels located at corresponding positions of the progressive intermediate image and the motion-compensated image by using the first cyclic coefficient as a weight and by adding pixel values of the second type of pixels located at corresponding positions of the progressive intermediate image and the motion-compensated image by using the second cyclic coefficient as a weight,
   wherein the cyclic-coefficient setting means sets the second cyclic coefficient to be greater than the first cyclic coefficient for the same vertical motion.

2. An image processing apparatus for converting an interlace input image into a progressive output image, comprising:
   interlace-progressive conversion means for converting the interlace input image into a progressive intermediate image;
   motion-vector detection means for detecting motion vectors of the interlace input image by using, as a minimum unit, a distance shorter than an interval between pixels forming the progressive intermediate image;
   cyclic-coefficient setting means for setting, on the basis of a vertical motion, which is a vertical component of each of the motion vectors, a first cyclic coefficient for a first type of pixel that is located at a position where a pixel forming the interlace input image exists, and a second cyclic coefficient for a second type of pixel, which is located at a position where a pixel forming the interlace input image does not exist;
   motion compensation means for motion-compensating, on the basis of the motion vectors, a past progressive output image to generate a motion-compensated image; and
   output image generating means for generating the progressive output image by adding pixel values of the first type of pixels located at corresponding positions of the progressive intermediate image and the motion-compensated image by using the first cyclic coefficient as a weight and by adding pixel values of the second type of pixels located at corresponding positions of the progressive intermediate image and the motion-compensated image by using the second cyclic coefficient as a weight;
   reliability detection means for detecting a reliability of the motion vector; and
   adjusting means for adjusting the first cyclic coefficient and the second cyclic coefficient on the basis of the reliability of the motion vector, wherein
   the motion vector detection means detects the motion vector for each block having a predetermined size,
   the reliability detection means detects differences between pixel values of pixels in each block of the interlace input image and pixel values of pixels in each block of a past progressive output image which is shifted from the block of the interlace input image by a direction and a distance indicated by the motion vector, and
   the adjusting means adjusts the first cyclic coefficient and the second cyclic coefficient to be smaller as the differences become greater.

* * * * *